(12) United States Patent
Edge et al.

(10) Patent No.: US 11,580,129 B2
(45) Date of Patent: Feb. 14, 2023

(54) QUALITY-AWARE DATA INTERFACES

(71) Applicant: Microsoft Technology Licensing, LLC, Redmond, WA (US)

(72) Inventors: Darren Keith Edge, Cambridge (GB); Jonathan Karl Larson, Bremerton, WA (US); Christopher Miles White, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 554 days.

(21) Appl. No.: 15/958,428

(22) Filed: Apr. 20, 2018

(65) Prior Publication Data

US 2019/0325036 A1    Oct. 24, 2019

(51) Int. Cl.
| | | |
|---|---|---|
| *G06F 16/25* | (2019.01) | |
| *G06N 20/00* | (2019.01) | |
| *G06F 16/23* | (2019.01) | |
| *G06F 16/248* | (2019.01) | |
| *G06F 16/904* | (2019.01) | |

(52) U.S. Cl.
CPC ............ *G06F 16/252* (2019.01); *G06F 16/23* (2019.01); *G06F 16/248* (2019.01); *G06F 16/904* (2019.01); *G06N 20/00* (2019.01)

(58) Field of Classification Search
CPC ...... G06F 16/252; G06F 16/23; G06F 16/904; G06F 16/248; G06N 20/00
See application file for complete search history.

(56) References Cited

U.S. PATENT DOCUMENTS

| | | | | |
|---|---|---|---|---|
| 6,041,331 A | * | 3/2000 | Weiner | G06F 16/34 |
| | | | | 707/E17.093 |
| 6,330,576 B1 | * | 12/2001 | Mochizuki | G06F 16/338 |
| | | | | 707/E17.082 |
| 7,340,466 B2 | * | 3/2008 | Odom | G06F 16/313 |
| 9,317,569 B2 | * | 4/2016 | Nie | G06F 16/248 |
| 9,325,653 B1 | * | 4/2016 | Peterson | G06F 16/955 |
| 9,697,751 B2 | * | 7/2017 | Ramos | G06F 16/29 |
| 10,679,015 B1 | * | 6/2020 | Szarvas | G06F 40/279 |

(Continued)

OTHER PUBLICATIONS

"Topic Modeling and t-SNE Visualization" (Year: 2016).*
"Appendix: How to Analyze Social Media Networks", Retrieved From: https://www.pewinternet.org/2014/02/20/appendix-how-to-analyze-social-media-networks/, Feb. 20, 2014, 3 Pages.

(Continued)

*Primary Examiner* — Ashish Thomas
*Assistant Examiner* — Abdullah A Daud
(74) *Attorney, Agent, or Firm* — Faegre Drinker Biddle & Reath LLP

(57) ABSTRACT

A set of unstructured data is analyzed to infer structural elements from the unstructured data, and quantized data quality levels, indicative of data quality in the structural elements, are assigned to the structural elements. A set of structured data is generated to include the structural elements inferred from the unstructured data and associations between respective ones of the structural elements in the set of structured data and the corresponding quantized quality levels assigned to the structural elements. The set of structured data, including the associations between respective ones of the structural elements and the corresponding quantized quality levels assigned to the structural elements, is provided to a user interface application to enable the user interface application to visually display varying data qualities in the set of structured data.

19 Claims, 15 Drawing Sheets

(56) References Cited

U.S. PATENT DOCUMENTS

| | | | | |
|---|---|---|---|---|
| 10,765,956 | B2* | 9/2020 | Bojja | G06F 40/40 |
| 11,244,108 | B2* | 2/2022 | Tu | G06F 40/58 |
| 2011/0258181 | A1* | 10/2011 | Brdiczka | G06F 16/355 |
| | | | | 707/723 |
| 2013/0212106 | A1* | 8/2013 | Inagaki | G06F 16/355 |
| | | | | 707/736 |
| 2014/0019119 | A1* | 1/2014 | Liu | G06F 40/10 |
| | | | | 704/9 |
| 2014/0303960 | A1* | 10/2014 | Orsini | G06Q 30/0217 |
| | | | | 704/2 |
| 2017/0124184 | A1* | 5/2017 | Podgorny | G06N 5/04 |
| 2017/0185279 | A1* | 6/2017 | Hiraishi | G06F 3/04847 |
| 2017/0186102 | A1* | 6/2017 | Di | G06Q 50/01 |
| 2017/0228445 | A1* | 8/2017 | Chiu | G06Q 50/01 |
| 2017/0308589 | A1* | 10/2017 | Liu | G06F 40/205 |
| 2017/0371869 | A1* | 12/2017 | Zhang | G06F 40/47 |
| 2018/0232354 | A1* | 8/2018 | Dunne | H04L 51/42 |
| 2018/0349817 | A1* | 12/2018 | Goel | G06Q 10/0635 |
| 2018/0357318 | A1* | 12/2018 | Chen | G06F 16/9535 |
| 2019/0073404 | A1* | 3/2019 | Klouche | G06F 16/9038 |
| 2019/0163327 | A1* | 5/2019 | Otero | G06F 3/0482 |
| 2019/0266249 | A1* | 8/2019 | Xu | G06F 40/103 |
| 2019/0294703 | A1* | 9/2019 | Bolin | G06N 3/08 |

OTHER PUBLICATIONS

"How We Analyzed Twitter Social Media Networks with NodeXL", Retrieved From: https://www.pewresearch.org/wp-content/uploads/sites/9/2014/02/How-we-analyzed-Twitter-social-media-networks.pdf, pp. 1-23.

"Topic Modeling and t-SNE Visualization", Retrieved From: https://shuaiw.github.io/2016/12/22/topic-modeling-and-tsne-visualzation.html, Dec. 22, 2016, pp. 1-15.

Edge, Darren, et al., "Bringing AI to BI: Enabling Visual Analytics of Unstructured Data in a Modern Business Intelligence Platform", In Extended Abstracts of the 2018 CHI Conference on Human Factors in Computing Systems, Apr. 21, 2018, 9 Pages.

"International Search Report and Written Opinion Issued in PCT Application No. PCT/US19/025692", dated Jun. 26, 2019, 12 Pages.

Vallandingham, Jim, "How to Make an Interactive Network Visualization", Retrieved From: https://flowingdata.com/2012/08/02/how-to-make-an-interactive-network-visualization/, 19 Pages.

"Advanced Search with Bing News", Retrieved from https://appsource.microsoft.com/en-us/product/web-apps/microsoft-powerbi.pbisolntemplate_cmpgnbrandmgnt_news?tab=Overview, Nov. 24, 2017, 2 Pages.

"Campaign/Brand Management for Twitter", Retrieved from https://appsource.microsoft.com/en-us/product/web-apps/microsoft-powerbi.pbisolntemplate_cmpgnbrandmgnt_twitter?, Nov. 25, 2017, 2 Pages.

* cited by examiner

QUALITY-AWARE DATA INTERFACES

FIELD OF THE DISCLOSURE

The present disclosure relates generally to data visualization and, more particularly, to analyzing and displaying unstructured data.

BACKGROUND

Data analysis systems, such as, for example, business intelligence (BI) systems, may analyze unstructured data such as, for example, data obtained from social media, on-line news sources and the like, to determine or infer navigable structures in the data. For example, such systems may utilize artificial intelligence (AI) engines, such as machine learning engines or other suitable data analysis engines, to group data items according to topics, to determine relevance or usefulness of data items in a group, to obtain language translations of data items, etc. The systems may then present (e.g., display) the inferred structures to a user. In some cases, the systems may determine a quality of the data structures or a likelihood of interest of the data to the user so that only higher quality data structures or data of higher interest is displayed to the user. For example, the system may only display data for which the quality or likelihood of interest exceeds a certain threshold. However, while displaying only higher quality data structures or data of higher likelihood of interest to the user reduces the amount of data presented to the user and results in a more clear presentation of data, in such typical systems, data that is determined by the system to be of lower quality or lower likelihood of interest and consequently is not shown to the user may nonetheless be of interest or importance to the user. Moreover, such typical systems do not allow the user to view the variability in the quality or relevance of data that is displayed or otherwise provided to the user.

SUMMARY

In an embodiment, a method for analyzing unstructured data includes receiving, at one or more hardware processors, a set of unstructured data, and analyzing, with the one or more hardware processors, the set of unstructured data to infer structural elements from the unstructured data. The method also includes assigning, with the one or more hardware processors, quantized data quality levels to the structural elements, the quantized data quality levels indicative of data quality in the structural elements. The method further includes generating, with the one or more hardware processors, a set of structured data to include at least i) the structural elements inferred from the unstructured data and ii) associations between respective ones of the structural elements in the set of structured data and the corresponding quantized quality levels assigned to the structural elements. The method further included providing, with the one or more hardware processors, the set of structured data, including the associations between respective ones of the structural elements and the corresponding quantized quality levels assigned to the structural elements, to a user interface application to enable the user interface application to visually display varying data qualities in the set of structured data.

In another embodiment, a system comprises a non-transitory memory for storing instructions and one or more hardware processors that are coupled to the non-transitory memory and that are configured to execute the instructions to cause the system to perform operations comprising: receiving a set of unstructured data; analyzing the set of unstructured data to infer structural elements from the unstructured data; assigning quantized data quality levels to the structural elements, the quantized data quality levels indicative of data quality in the structural elements; generating a set of structured data to include at least i) the structural elements inferred from the unstructured data and ii) associations between respective ones of the structural elements in the set of structured data and the corresponding quantized quality levels assigned to the structural elements; and providing the set of structured data, including the associations between respective ones of the structural elements and the corresponding quantized quality levels assigned to the structural elements, to a user interface application to enable the user interface application to visually display varying data qualities in the set of structured data.

In yet another embodiment, a tangible computer readable medium, or media, storing machine readable instructions that, when executed by one or more processors, cause the one or more processors to: receive a set of unstructured data; analyze the set of unstructured data to infer structural elements from the unstructured data; assign quantized data quality levels to the structural elements, the quantized data quality levels indicative of data quality in the structural elements; generate a set of structured data to include at least i) the structural elements inferred from the unstructured data and ii) associations between respective ones of the structural elements in the set of structured data and the corresponding quantized quality levels assigned to the structural elements; and provide the set of structured data, including the associations between respective ones of the structural elements and the corresponding quantized quality levels assigned to the structural elements, to a user interface application to enable the user interface application to visually display varying data qualities in the set of structured data.

DETAILED DESCRIPTION

In various embodiments described below, a data analytics system analyzes a set of unstructured data to infer structure from the data, and presents the data based on the inferred structure in a manner that allows a user to view data distributions across inference quality levels and/or filter visual presentation to show only the data with desired inference quality levels. In an embodiment, the data analytics system comprises a data pipeline that accesses unstructured data, infers structural elements from the data, assigns quality or relevance levels to the inferred structural elements in the data, and displays the data to show the inferred structures. The data analytics system may display the data structures to show variations in quality or relevance of the data structures, and may allow a user to filter the displayed structures so that only data of certain quality or relevance level is shown. These and other techniques described herein allow the data analytics system to avoid premature commitment to a quality or relevance threshold for displaying data. Instead, quality or relevance of data is made a first-class interface element, allowing users to interactively explore trade-offs between coverage (e.g., displaying all data) and visual clarity (e.g., displaying subsets of data of given quality levels), in at least some embodiments. Moreover, the data analytics system may present data to a user even if the data is judged to be of relatively low quality or relevance, thereby allowing users to calibrate system-assigned quality levels against the user's own human judgement of data qualities, in at least some embodiments.

Figure 1:
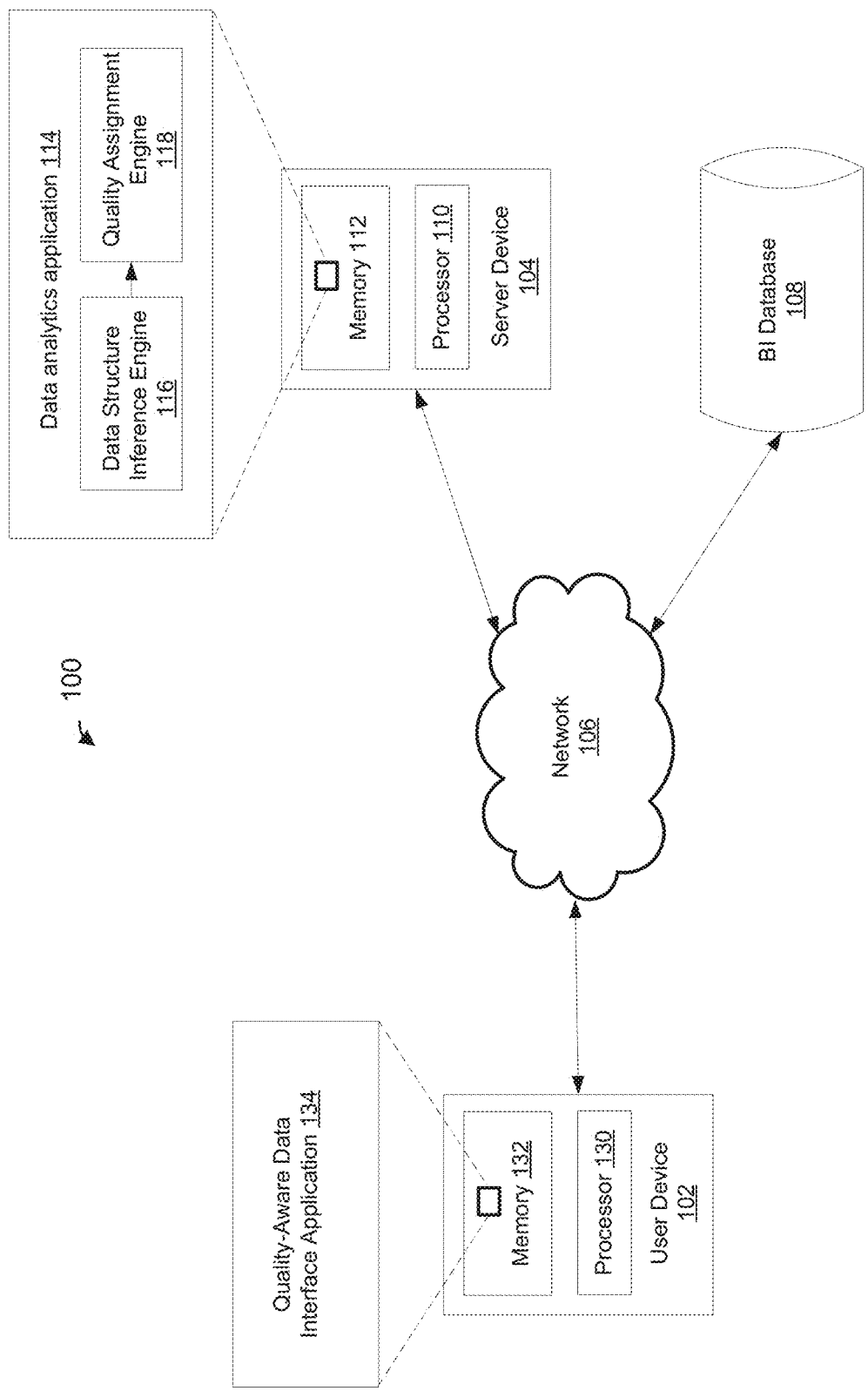
FIG. 1 is a block diagram of a computing system 100 in which a data analytics system may be implemented, according to an embodiment.

FIG. 1 is a block diagram of a computing system 100 in which a data analytics system may be implemented, according to an embodiment. In an embodiment, the computing system 100 includes one or more user devices 102 communicatively coupled to a server device 104 via a network 106. The network 106 may be a wide area network (WAN) such as the Internet, a local area network (LAN), or any other suitable type of network. The network 106 may be single network or may be made up of multiple different networks, in some embodiments. The system 100 may also include a database 108. The database 108 may be communicatively coupled to the server device 104 and/or to the one or more user devices 102 via the network 106, as illustrated in FIG. 1, or may be coupled to the server device 104 and/or to the one or more user devices 102 in other suitable manners. For example, the database 108 may be communicatively coupled directly to the server device 102, or may be included as part of the server device 102, in some embodiments. The database 108 may be a single database or may include multiple different databases. The user devices 102 may include, for example, personal computers, cellular phones, smart phones, and other suitable web-enabled devices communicatively coupled to the server 104 via the network 106.

The server device 104 is illustrated in FIG. 1 as including a processor 110 and a computer readable memory 112 that stores computer readable instructions executable by the processor 110. The computer readable memory 112 may store a data analytics application 114. The computer readable memory 112 may include volatile memory to store computer instructions, such as Random Access Memory (RAM), and may also include persistent memory such as a hard disk, for example. In some embodiments, the server device 104 includes multiple processors 110. Further, in some embodiments, the data analytics application 114 may be implemented using hardware components, firmware components, software components, or any combination thereof.

The data analytics application 114 may be configured to receive or otherwise obtain a set of data or information that may be of interest to a user of the user devices 102. For example, the data analytics application 114 is configured to search one or more data sources, such as social media websites, new websites, etc., based on search criteria (e.g., a search query) provided by a user of a user device 102 to obtain data that may be of interest to the user. The data obtained by the data analytics application 114 is generally unstructured. Such unstructured data generally does not conform to a particular or uniform format and may not be suitable for storage and analysis using relational databases and infrastructures. The unstructured data obtained by or provided to the data analytics application 114 may include, for example, text or multimedia content, such as any suitable combinations of one or more of social media postings, news articles, customer feedback (e.g., on product websites), e-mail messages, word processing documents, presentations, photographs, audio files, video files, etc.

The data analytics application 114 includes a data structuring engine 116 and a data quality assignment engine 118, in the illustrated embodiment. The data structuring engine 116 may be configured to enhance the obtained unstructured data, for example by using an artificial intelligence (AI) engine (e.g., a machine learning (ML) engine) to infer structural elements from the unstructured data. For example, the data structuring engine 116 may be configured to categorize data items, to infer a language of data items (e.g., to infer a language of a tweet that includes a hashtag of interest to the user), to translate data items from a foreign language to a language of interest to the user, to infer sentiment expressed in the data items, to identify a named entity in a data item (e.g., a news article), to group items (e.g., news articles) according to topics, etc., in various embodiments. As a more specific example, in an embodiment, the data structuring engine 116 is configured to analyze a set of social media postings (e.g., tweets related to a product) to infer connections between hashtags used in the tweets and languages of the tweets. As another example, in an embodiment, the data structuring engine 116 is configured to analyze a set of foreign language social media postings (e.g., tweets related to a product) to infer volume of foreign language social media postings over time and/or to rank the foreign language social media postings according to influence. The data structuring engine 116 may employ a machine translation engine (not shown) to translate the social media postings from the foreign language to a language of interest to the user. As yet another example, in an embodiment, the data structuring engine 116 is configured to analyze a set of documents (e.g., news articles related to an election) to identify named entities in the documents and/or to cluster the news articles according to topics. In other embodiments, the data structuring engine 116 is configured to analyze other suitable datasets and/or is configured to make other suitable inferences.

The data quality assignment engine 118 may be configured to assign quantized data qualities to the structural elements obtained from the data by the data structuring engine 116, in an embodiment. The data quality assignment engine 118 may assign quantized data qualities based on confidence or uncertainty scores provided for the structural elements by the data structuring engine 116 and/or an AI engine (e.g., ML engine) utilized by the data structuring engine 116 to infer the structural elements. As just an example, in an embodiment in which data analysis performed by the data structuring engine includes obtaining machine translations of data items by a machine translation engine, the data quality assignment engine 118 may assign data qualities based on translation confidence scores provided to the translations by the machine translation engine. In some embodiments, the data quality assignment engine 118 may perform additional analysis of outputs of the data structuring engine 116 and/or the AI/ML engine utilized by the data structuring engine 116 to infer the structural elements, and may assign the quantized quality levels based at least in part on the additional analysis. For example, the data quality assignment engine 118 may map confidence or uncertainty scores, provided by the data structuring engine 116 and/or the AL/ML engine, to specific semantics such as reputation or trust. As another example, the data quality assignment engine 118 may aggregate outputs of the data structuring engine 116 and/or the AI/ML engine utilized by the data structuring engine 116 to distances AI/ML metrics such as weights, strengths, distances, and similarities. In other embodiments, data quality assignment engine 118 may utilize other suitable metrics to assign the quantized quality levels to the structural elements obtained from data by the data structuring engine 116.

Assigning quantized data qualities may comprise assigning, to each structural element, a data quality level selected from a set of predetermined data quality levels. For example, in an embodiment in which analysis by the data structuring engine 116 includes translation of data items from a foreign language to a language of interest to the user, the data quality assignment engine 118 may assign, for example based on a translation confidence indicator provided by the machine translation engine, a translation confidence level (e.g., selected from a set of predetermined translation confidence levels) to the translated data items to indicate a likelihood of accuracy of the translation of the data items. As another example, in an embodiment in which the data structuring engine 116 infers connections between hashtags and languages, the data quality assignment engine 118 may assign co-occurrence levels to the hashtag to indicate frequency of appearance of the hashtags in the corresponding languages. As yet another example, in an embodiment in which the data structuring engine 116 infers relevance of news articles to a topic, the data quality assignment engine 118 may assign level of similarity of an article to the topic.

In an embodiment, the data analytics application 114 is configured to provide the enhanced data, with the structural elements inferred from to the data, and the quantized quality levels assigned to the structural elements, to a user device 102 and/or make the information accessible by the user device 102. In an embodiment, the data analytics application 114 is configured to generate a set of structured to include at least i) structural elements inferred from the set of unstructured data and ii) associations between respective ones of the structural elements in the set of structured data and the corresponding quantized quality levels assigned to the structural elements, and to store the set of structured data in the databased 108 accessible by the user device 102.

The user device 102 is illustrated in FIG. 1 as including a processor 130 and a computer readable memory 132 that stores computer readable instructions executable by the processor 130. The computer readable memory 112 may store a quality-aware data interface application 134 (sometimes referred to herein as simply "data interface application"). The computer readable memory 112 may include volatile memory to store computer instructions, such as Random Access Memory (RAM), and may also include persistent memory such as a hard disk, for example. In some embodiments, the user device 102 includes multiple processors 130. Further, in some embodiments, the data interface application 134 may be implemented using hardware components, firmware components, software components, or any combination thereof.

In an embodiment, the data interface application 134 is configured to display the structural elements inferred by the data structuring engine 116, to provide visual representation of the structural elements to the user. In an embodiment, the data interface application 134 is configured to utilize quality levels assigned to the data by the data quality assignment engine 118 of the data analytics application 114, for example to display the structural elements across different quality levels and/or to allow the user to filter the data by the quality levels. By allowing a user to visualize data across inference quality and/or to filter the data based on data quality, the quality aware-data interface application 134 enables the user to see variations of data quality in the data presented to the user and/or to select subsets of data having certain qualities for further visualization and analysis by the user, in at least some embodiments.

In some embodiments, the data interface application 134 determines quality levels for inferred data locally, and utilizes the locally-determined quality levels to display the inferred structural elements across different quality levels and to allow a user to filter the display of inferred structural elements by the quality levels. For example, the interface application 134 includes a local data quality assignment engine, such as the data quality assignment engine 118, in an embodiment. The data analytics application 134 omits the data quality assignment engine 118, in some such embodiments. Further, in some embodiments, the user device 102-1 implements a combined data analytics and interface application. For example, the memory 132 of the user device 102-1 may store a data analytics application, such as the data analytics application 114, in addition to or combined with the data inference application 134. In some such embodiments, the server device 104 may omit the data analytics application 114. Moreover, the database 108 may be omitted from the system 100, in some such embodiments.

FIGS. 2A-2D are diagrams of a user interface 200 that may be generated by a data interface application such as the data interface application 134 of FIG. 1, and interaction of a user with the user interface 200, according to an embodiment. In an embodiment, the user interface 200 is generated by the data interface application 134 of FIG. 1 to display structural elements inferred by the data analytics application 114 of FIG. 1, and to allow a user to interactively explore the data based on quality levels assigned to the structural elements. In the example embodiment illustrated in FIGS. 2A-2D, the data interface application 134 generates the user interface 200 to display hashtag to language connections determined by the data structuring engine 116, and to allow a user to interactively explore the hashtag to language connections based on co-occurrence levels assigned to the connections by the data quality assignment engine 118. For ease of explanation, the user interface 200 is described with respect to the data analytics system of FIG. 1. However, in other embodiments, the user interface 200 is generated by data analytics systems different from the data analytics systems of FIG. 1.

The user interface 200 includes a display portion 202 and an interactive display control portion 204. The display portion 202 may display language nodes 210 and hashtag nodes 212. Respective language nodes 210 may correspond to respective ones of different languages. For example, a first language node 210-1 may correspond to "English," a second language node 201-2 may correspond to "Spanish," a third language node 210-3 may correspond to "Japanese," and so on. Respective hashtag nodes 212 may correspond to respective hashtags that may be inferred from social media postings (e.g., tweets) analyzed by the data analytics application 114, for example.

With continued reference to FIGS. 2A-2D, connection lines 214 between language nodes 210 and hashtag nodes 212 may indicate connections between the hashtags and the languages. In an embodiment, co-occurrence levels of hashtags are depicted in the display portion 202 by thickness of connection lines 214 connecting hashtag nodes 212 and language nodes 210. For example, a relatively thicker connection line 214 between a particular hashtag node 212 and a particular language node 210 indicates a higher co-occurrence level of the hashtag corresponding to the particular hashtag node 212 in tweets of the language corresponding to the particular language node 210, and a relatively thinner connection line 214 between a particular hashtag node 212 and a particular language node 210 indicates a lower co-occurrence level of the hashtag corresponding to the particular hashtag node 212 in tweets of the language corresponding to the particular language node 210, or vice-versa, in various embodiments. In an embodiment, relative thicknesses of connection lines 214 correspond to the relative quantized co-occurrence levels assigned to hashtags by the data quality assignment engine 118. Thus, for example, the data interface application 134 generates and displays relatively thicker connection lines 214 between hashtags and languages with assigned higher levels of co-occurrence (e.g., level 1) in the corresponding languages, and generates and displays relatively thinner connection lines 214 between hashtags and languages with assigned higher levels of co-occurrence (e.g., level 2) in the corresponding languages, in an embodiment.

The interactive display control portion 204 includes a "filter by co-occurrence level" portion 206 and a "count by co-occurrence level" portion 208, in the illustrated embodiment. The filer by co-occurrence level portion 206 allows a user to select one or more co-occurrence levels for display in the display portion 202. The filter by co-occurrence level portion 206 provides a set of five co-occurrence level options, corresponding to five predetermined co-occurrence levels that may be assigned to hashtags by the data quality assignment engine 118, in the illustrated embodiment. In other embodiments, other suitable number of co-occurrence levels are utilized and/or other suitable number of co-occurrence level options are provided.

The filer by co-occurrence level portion 206 may include, for example, a "select all" button and a set of co-occurrence level buttons showing respective co-occurrence levels that may be assigned to hashtags by the data quality assignment engine 118. A user may indicate that hashtags of all co-occurrence levels are to be displayed in the display portion 202, for example by clicking on the "select all" button in the filter by co-occurrence level portion 206, or may indicate that only hashtags of desired one or more co-occurrence levels are to be displayed, for example by clicking on respective co-occurrence level buttons corresponding to the desired one or more co-occurrence levels in the filter by co-occurrence level portion 206. In response to detecting that a user has indicated that all co-occurrence levels are to be displayed in the display portion 202, the data interface application 134 may display analyzed hashtags with all co-occurrence levels in the display portion 202, with relative thicknesses of connection lines 214 depicting particular co-occurrence levels in the data portion 202. On the other hand, in response to detecting that a user has indicated that only hashtags of desired one or more co-occurrence levels are to be displayed, the data interface application 134 may limit the hashtags displayed in the display portion 202 to only the hashtags with the desired one or more co-occurrence levels, with relative thicknesses of connection lines 214 depicting particular co-occurrence levels in the data portion 202.

Referring still to FIGS. 2A-2D, the data interface application 134 may be configured to generate the count by co-occurrence level portion 208 to show numbers of hashtags displayed in the display portion 202, for a particular selected node 210 and for the specific co-occurrence levels displayed in the display portion 202, in an embodiment. A user may select a particular node 210 by hovering over the particular node 210, or by clicking on the particular node 210. For example, in the illustrated embodiment, the data interface application 134 detects that the node 210-1 corresponding to English language is selected and that hashtags for all assigned co-occurrence levels are displayed, and accordingly the data interface application 134 displays, in the count by co-occurrence level portion 208, respective numbers of hashtag nodes 212 connected to the English language node 210-1 for each of the five levels of co-occurrence levels. For example, in referring to the example scenario of FIG. 2A, the data interface application 134 displays in the count by co-occurrence level portion 204 that, for the node 210-1 corresponding to the English language, 13 displayed hashtags are associated with co-occurrence level of 1, 17 displayed hashtags are associated with co-occurrence level of 2, 25 displayed hashtags are associated with co-occurrence level of 2, 60 displayed hashtags are associated with co-occurrence level of 4, and 122 displayed hashtags are associated with co-occurrence level of 5, in the illustrated example. The count by co-occurrence level numbers may be useful to a user in deciding which, if any, co-occurrence levels to further explore, for example, in an embodiment.

Figure 2A:
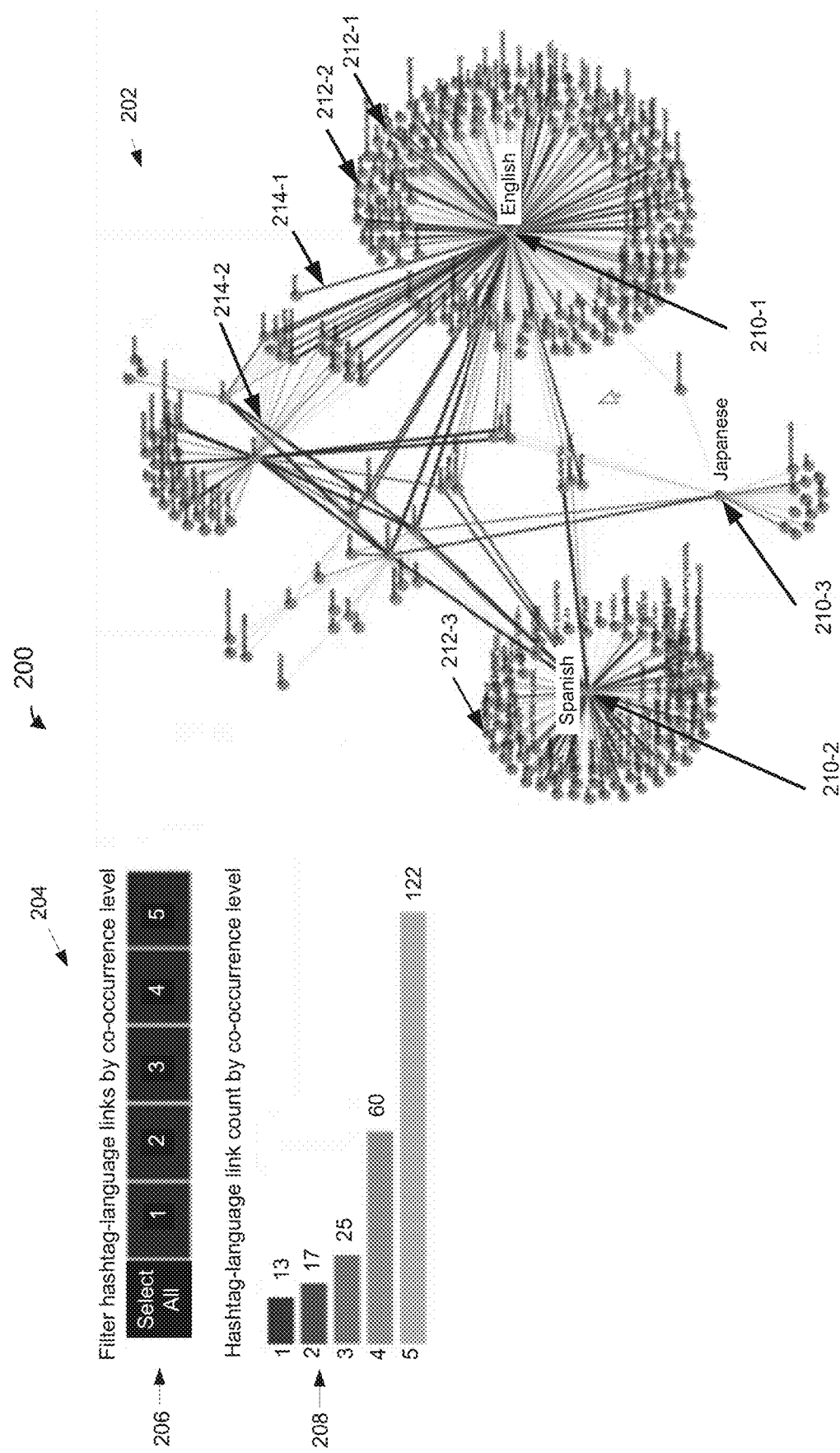
FIGS. 2A-2D are diagrams of a user interface that may be generated by the data analytics system of FIG. 1, and interaction of a user with the user interface, according to an embodiment.
Figure 2B:
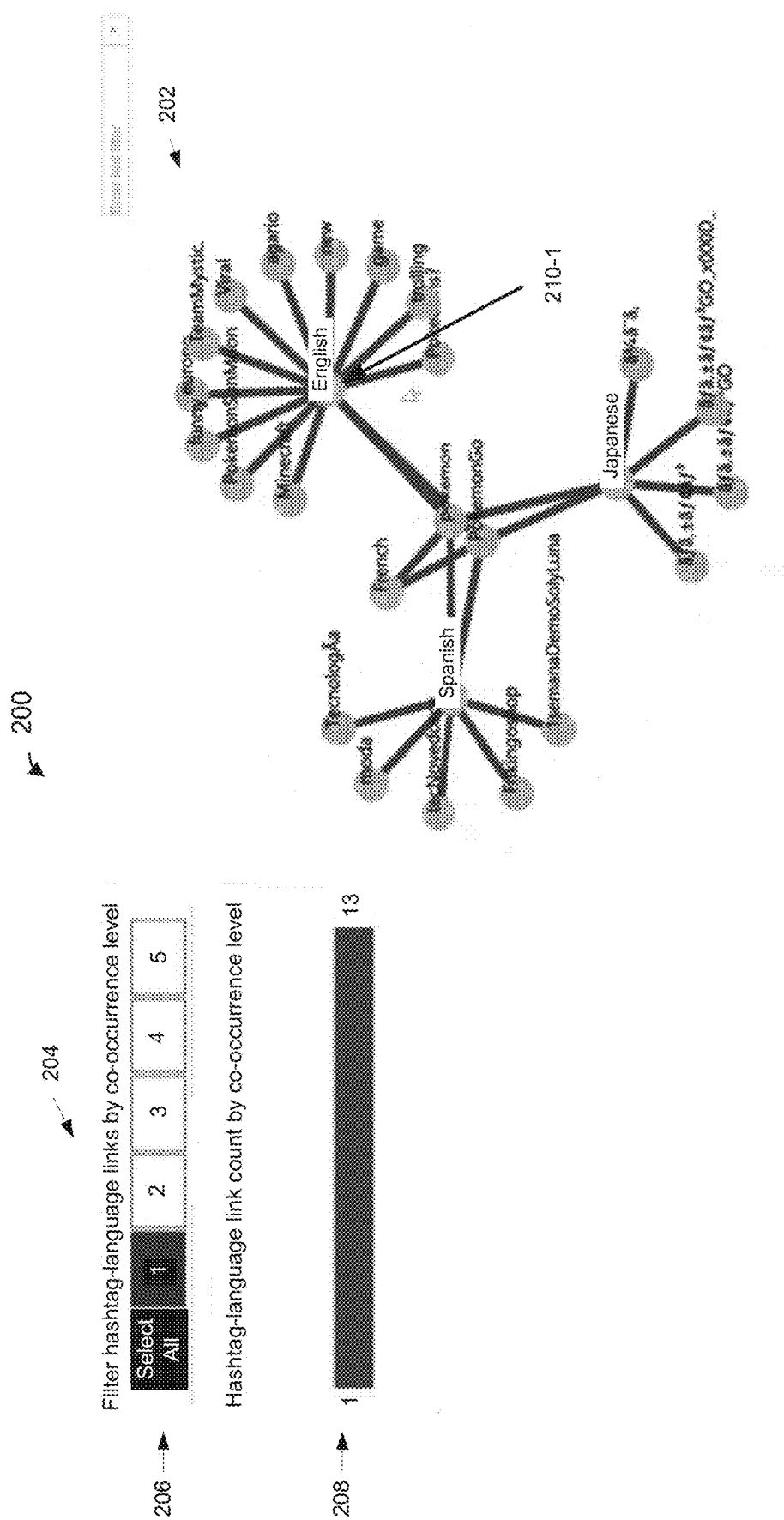

FIG. 2B illustrates a scenario in which the user has indicated in the filter by co-occurrence level portion 206 a selection to display only the hashtags associated with co-occurrence level of 1 (e.g., highest co-occurrence level) in the display portion 202, in the illustrated embodiment. In response to detecting the indication in the filter by co-occurrence portion 206 to display only the hashtags associated with co-occurrence level of 1, the data interface application 134 causes the display portion 202 to display, for each language node 210, only those hashtags nodes 212 that correspond to hashtags associated with the co-occurrence level of 1 (e.g., highest co-occurrence). For example, for the English language node 210-1, as shown in the count by co-occurrence level portion 208, only the 13 hashtags associated with co-occurrence level of 1 are displayed. By filtering the display portion 202 in this manner, the user is able to more clearly see hashtags with highest co-occurrence level, for example, in an embodiment.

Figure 2C:
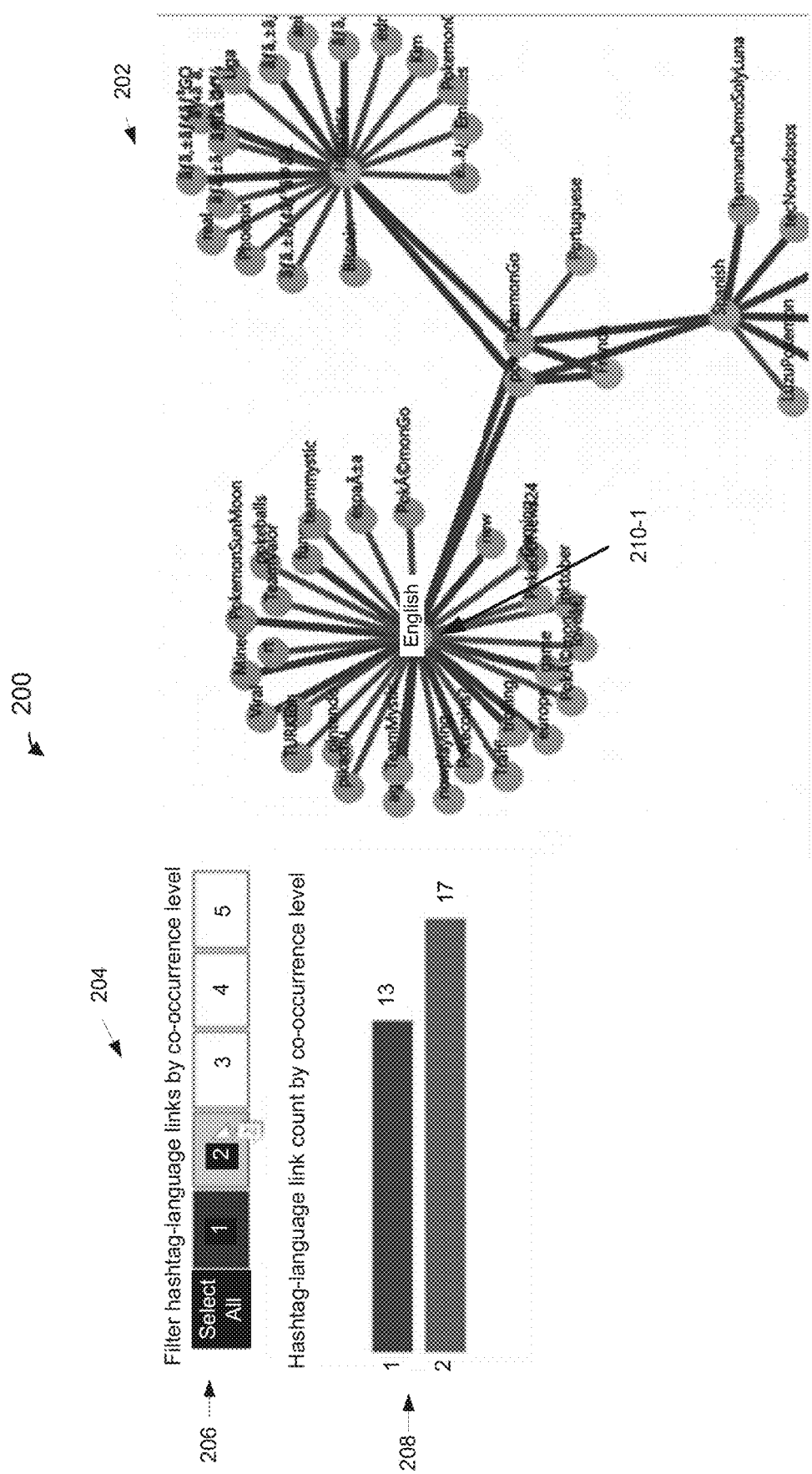

FIG. 2C illustrates a scenario in which the user has indicated in the filter by co-occurrence level portion 206 a selection to display hashtags associated with co-occurrence levels of 1 (e.g., the highest co-occurrence level) and 2 (e.g., second highest co-occurrence level) in the display portion 202, in the illustrated embodiment. In response to detecting the indication in the filter by co-occurrence portion 206 to display hashtags associated with co-occurrence levels of 1 and 2, the data interface application 134 causes the display portion 202 to display, for each language node 210, only those hashtags nodes 212 that correspond to hashtags having the co-occurrence levels of 1 (e.g., highest co-occurrence) and 2 (e.g., second highest co-occurrence level). For example, for the English language node 210-1, as shown in the count by co-occurrence level portion 204, only i) the 13 hashtags associated with co-occurrence level 1 and ii) the 17 hashtags associated with the co-occurrence level 2 are displayed. By filtering the display 200 in this manner, the user is able to more clearly see hashtags with highest two co-occurrence levels, in an embodiment.

Figure 2D:
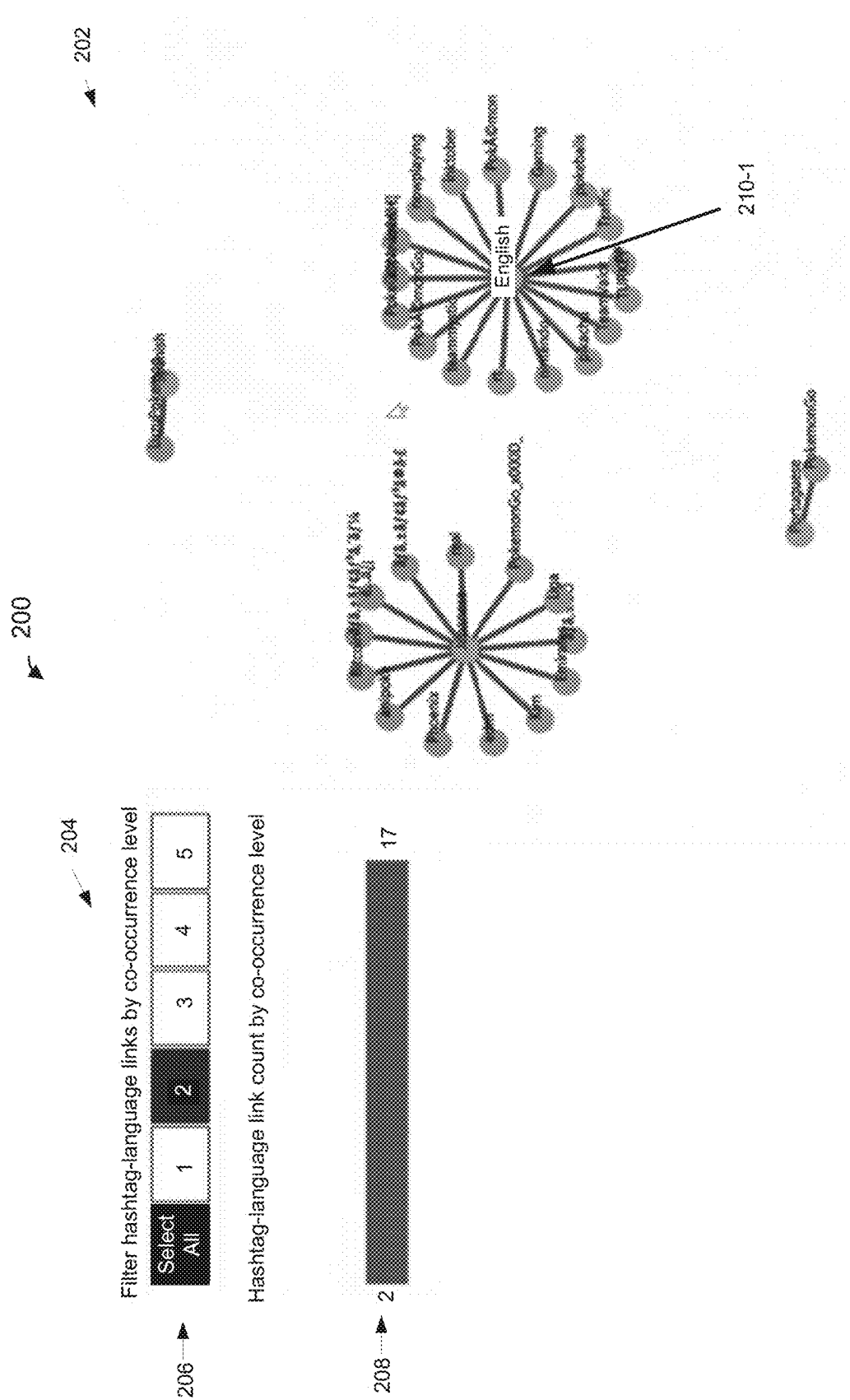

FIG. 2D illustrates a scenario in which the user has the user has indicated in the filter by co-occurrence portion 206 a selection to isolate the hashtags associated with co-occurrence level of 2 (e.g., second highest co-occurrence level) in the display portion 202, according to an embodiment. For example, the user has indicated the selection by depressing the button corresponding co-occurrence level of 1 in the filter by co-occurrence section 206. In response to detecting the indication in the filter by co-occurrence portion 206 to isolate the hashtags having co-occurrence level of 2, the data interface application 134 causes the display portion 202 to display, for each language node 210, only those hashtags nodes 212 that correspond to hashtags associated with the co-occurrence level of 2 (e.g., second highest co-occurrence). For example, for the English language node 210-1, as shown in the count by co-occurrence level portion 208, only the 17 hashtags associated with hashtags associated with co-occurrence level of 2 are displayed. By filtering the display portion 202 in this manner, the user is able to more clearly see hashtags with the second highest co-occurrence level, in an embodiment.

Figure 3A:
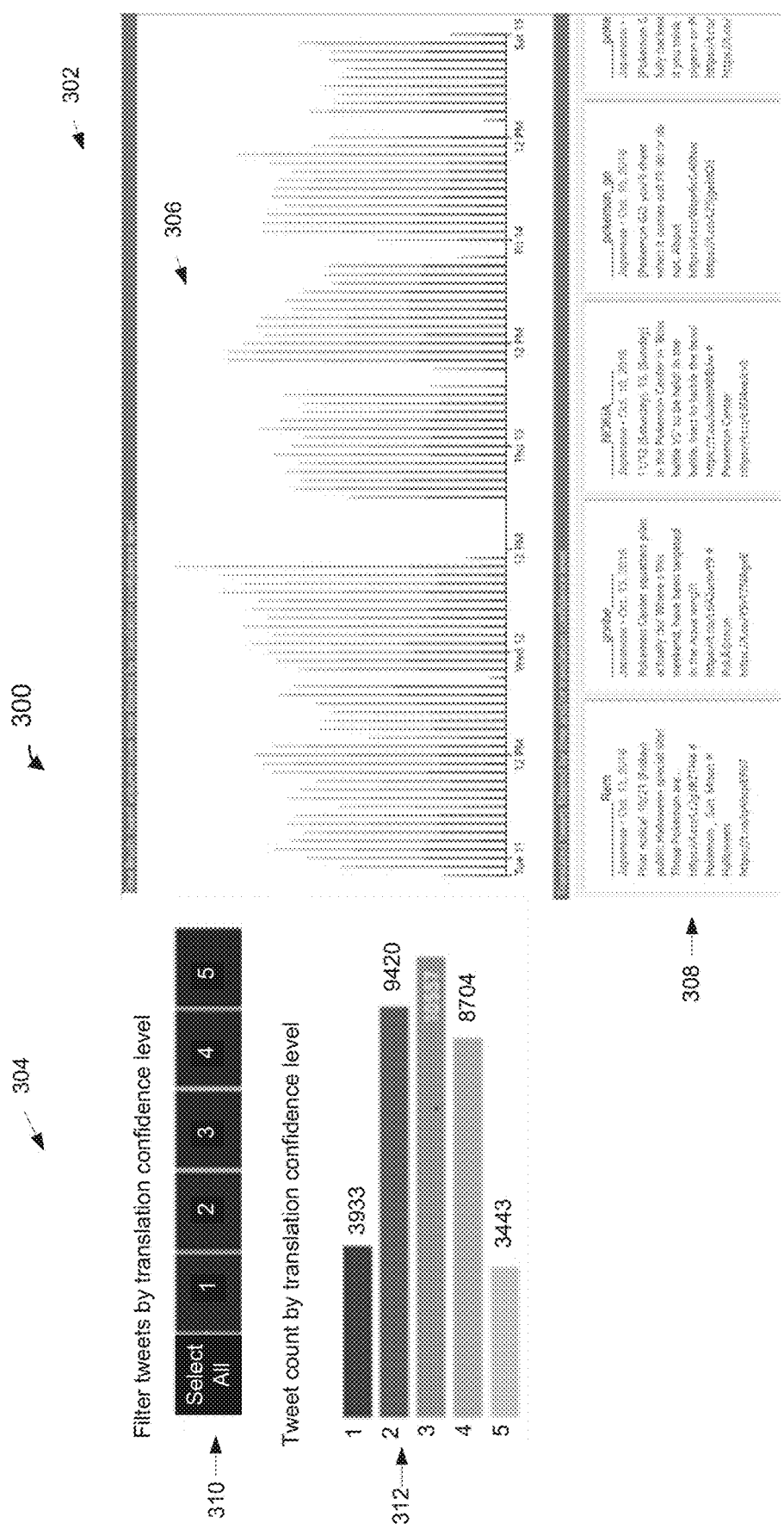
FIGS. 3A-3C are diagrams of a user interface that that may be generated by the data analytics system of FIG. 1, and interaction of a user with the user interface, according to another embodiment.
Figure 3B:
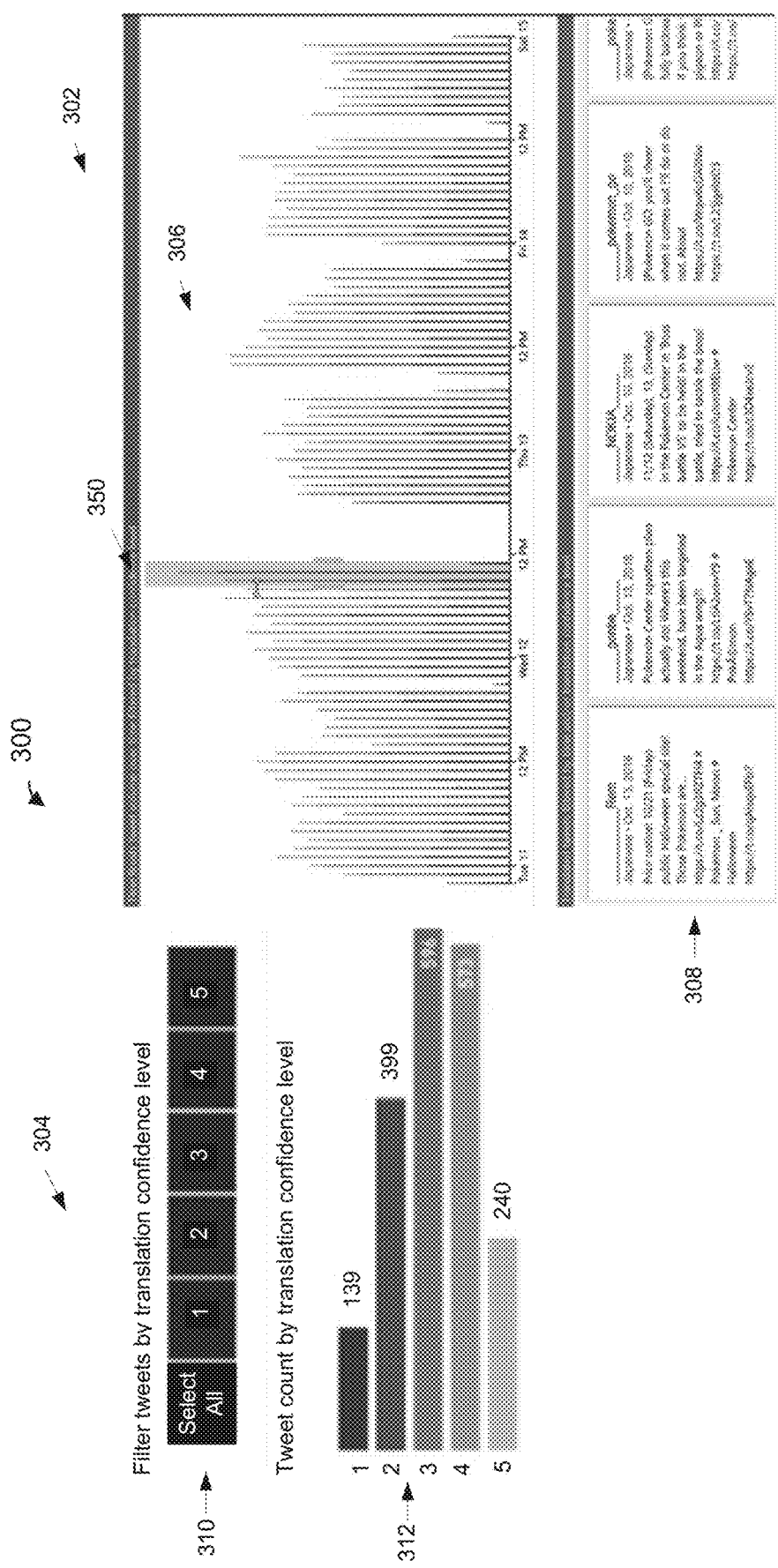
Figure 3C:
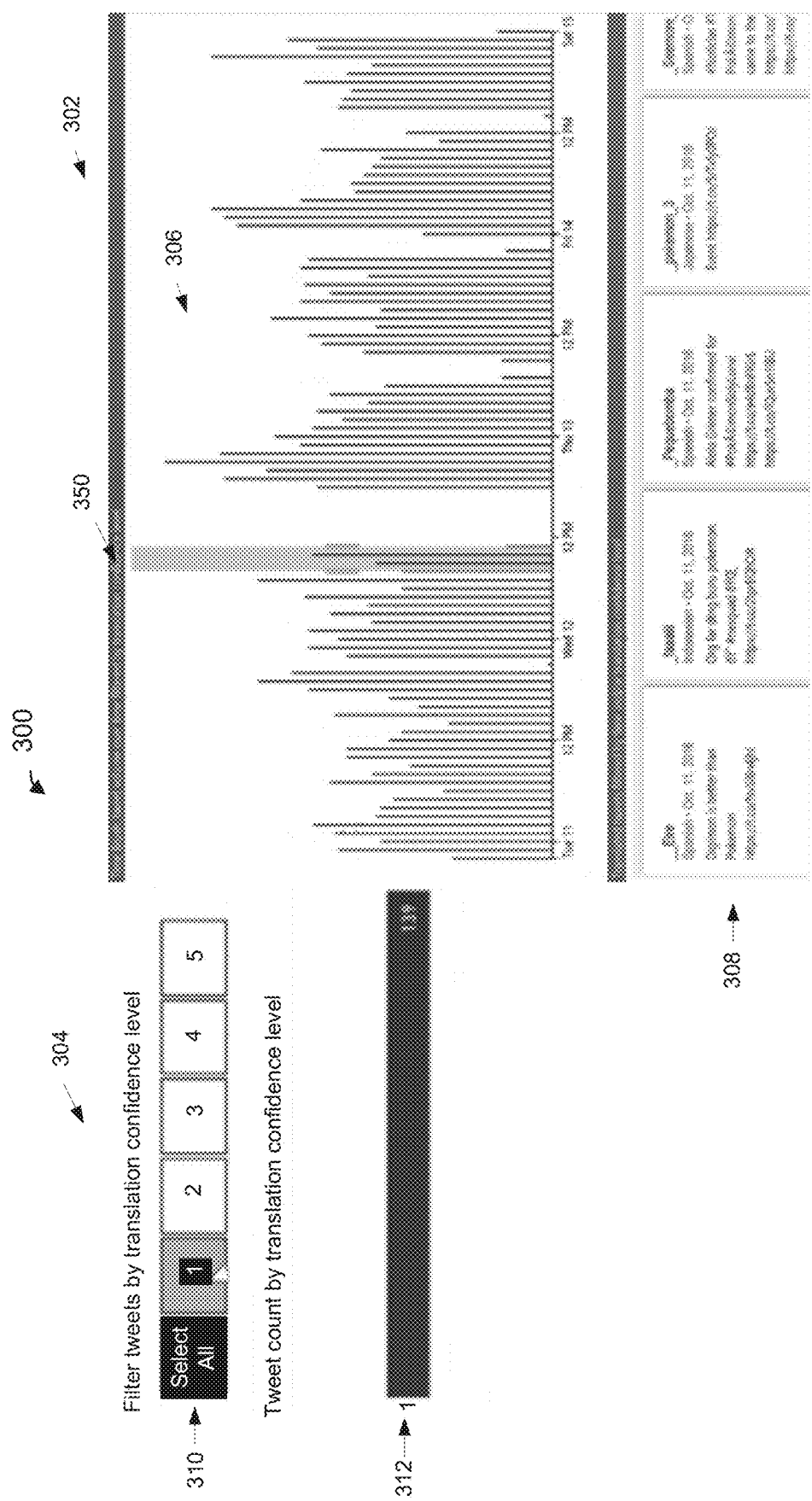

FIGS. 3A-3C are diagrams of a user interface 300 that may be generated by a data interface application such as the data interface application 134 of FIG. 1, and interaction of a user with the user interface 300, according to another embodiment. In an embodiment, the user interface 300 is generated by the data interface application 134 of FIG. 1 to display data provided by the data analytics application 114 of FIG. 1, and to allow a user to interactively explore the data based on quality of data structures inferred or determined from the data. For example, the data interface application 134 generates the user interface 300 to display volume of translated non-English language tweets over time determined by the data structuring engine 116, and to allow a user to interactively explore the volume of translated tweets based on translation confidence levels assigned to the translated tweets by the data quality assignment engine 118. For ease of explanation, the user interface 300 is described with respect to the data analytics system of FIG. 1. However, in other embodiments, the user interface 300 is generated by data analytics systems different from the data analytics systems of FIG. 1.

Referring to FIGS. 3A-3C, the user interface 300 includes a display portion 302 and an interactive display control portion 304. The display portion 302 includes a timeline 306 and a tweet display 308. The timeline 306 may be generated to depict volume of translated tweets (e.g., tweets meeting user search criteria) at different points in time, and the tweet display 308 may be generated to depict the actual translated tweets included in the volume representation in the timeline 306, or included in a selected portion of the volume representation in the timeline 306. The timeline 306 may be in the form of a bar graph, for example, with heights of respective bars representing volumes of tweets at the corresponding times. In an embodiment, the timeline 306 may depict multiple bars simultaneously for a particular time, with respective ones of the multiple bars corresponding to different translation confidence levels assigned to the corresponding translations by the data quality assignment engine 118. Bars corresponding to different translation confidence levels may be indicated by different coloring and/or shading in the timeline 306. For example, relatively darker-shaded bars in the timeline 306 may signify volume of tweets with relatively higher translation confidence levels, while relatively lighter-shaded bars may signify volume of tweets with relatively lower translation confidence levels, or vice-versa, in various embodiments.

The interactive display control portion 304 includes a "filter by translation confidence level" portion 310 and a "count by translation confidence level" portion 312, in the illustrated embodiment. The filter by translation confidence level portion 310 allows a user to select one or more translation confidence levels to cause only the translated tweets associated with the one or more translation confidence levels to be included in the timeline 306 and depicted in the tweet display 308. The filter by translation confidence level portion 310 provides a set of five translation confidence level options, corresponding to five predetermined translation confidence levels that may be assigned to translated tweets by the data quality assignment engine 118, in the illustrated embodiment. In other embodiments, other suitable numbers of translation confidence levels are utilized and/or other suitable number of translation confidence level options are provided.

The filter by translation confidence level portion 310 may include a "select all" button and a set of translation confidence level buttons showing respective translation confidence levels that may be assigned to translated tweets by the data quality assignment engine 118. A user has may indicate, for example by clicking on the "select all" button in the filter by translation confidence level portion 310, that translated tweets of all translation confidence levels are to be displayed in the tweet display 308, or may indicate, for example by clicking on respective translation confidence level buttons corresponding to desired one or more translation confidence levels, that only translated tweets associated with the desired one or more translation confidence levels are to be displayed in the tweet display 308. In response to detecting that a user has indicated that translated tweets of all translation confidence levels are to be displayed in the tweet display 308, the data interface application 134 may cause tweets of all translation confidence levels are to be included in the timeline 306 and displayed in the tweet display 308. On the other hand, in response to detecting that a user has indicated that only translated of desired one or more translation confidence levels are to be displayed in the tweet display 308, the data interface application 134 may limit the tweets included in the timeline 306 and displayed in the tweet display 308 to tweets associated with the one or more translation confidence levels.

The count by translation confidence level portion 312 may be generated to show overall numbers of translated tweets included in the timeline 306 and displayed in the tweet display 308 for each translation confidence level indicated in the filter by translation confidence level portion 310, in an embodiment. The count by translation confidence level portion 312 may provide the user an overview of tweet volume depicted in the timeline 306 and displayed in the tweet display 306, and may be useful to the user in deciding which, if any, translation confidence levels to further explore, for example, in an embodiment.

Referring now to specifically to FIG. 3A, a user has indicated that that translated tweets of all translation confidence levels are to be included in the timeline 306 and displayed in the tweet display 308, in the illustrated scenario. In response to detecting the indication that translated tweets of all translation confidence levels are to be displayed in the tweet display 308, the data interface application 134 causes translated tweets of all translation confidence levels to be depicted in the timeline 306 and displayed in the tweet display 308, in the illustrated embodiment. Further, the data interface application 134 generates the count by translation confidence level portion 312 to show that the timeline 306 and the tweet display 308 includes 3933 translated tweets having translation confidence level of 1, 9420 translated tweets having translation confidence level of 2, 10557 translated tweets having translation confidence level of 3, 8704 translated tweets having translation confidence level of 4, and 3443 translated tweets having translation confidence level of 5, in the illustrated embodiment.

Turning now to FIG. 3B, the user may select a portion 350 of the timeline 306 to limit the translated tweets displayed in the tweet display 308 to the translated tweets within the selected portion of the timeline 306. In response to detecting the selection of the portion 350 of the timeline 306, the data interface application 134 displays, in the tweet display 308, only the translated tweets represented within the selected portion 350 of the timeline 306. Further, the data interface application 134 modifies the count by translation confidence level portion 312 to show numbers of translated tweets, displayed in the tweet display 308, for each selected translation confidence level within the selected portion 350, in an embodiment. For example, the data interface application 134 modifies the count by translation confidence level portion 312 to show that the selected portion 350 in the timeline 306 includes 139 translated tweets having translation confidence level of 1, 399 translated tweets having translation confidence level of 2, 596 translated tweets having translation confidence level of 3, 573 translated tweets having translation confidence level of 4, and 240 translated tweets having translation confidence level of 1, in the illustrated embodiment.

Turning now to FIG. 3C, the user has indicated that that only the translated tweets associated with translation confidence level of 1 (e.g., highest translation confidence level) in the portion 350 of the timeline 306 are to be displayed in the tweet display portion 308, in the illustrated scenario. In response to detecting the indication that only the translated tweets associated with translation confidence level of 1 are to displayed in the tweet display 308, the data interface application 134 causes the tweet display 308 to display only the subset of the translated tweets that i) have timestamps within the portion 350 of the timeline 306 and ii) are assigned translation confidence level of 1 by the data quality assignment engine 118. Further, the data interface application 134 modifies the count by translation confidence level portion 312 to show numbers of translated tweets, displayed in the tweet display 308, for only the selected translation confidence level 1 within the selected portion 350, in an embodiment. For example, the data interface application 134 modifies the count by translation confidence level portion 312 to only show that the selected portion 350 in the timeline 306 includes 139 translated tweets associated with translation confidence level of 1, in the illustrated embodiment.

Figure 4A:
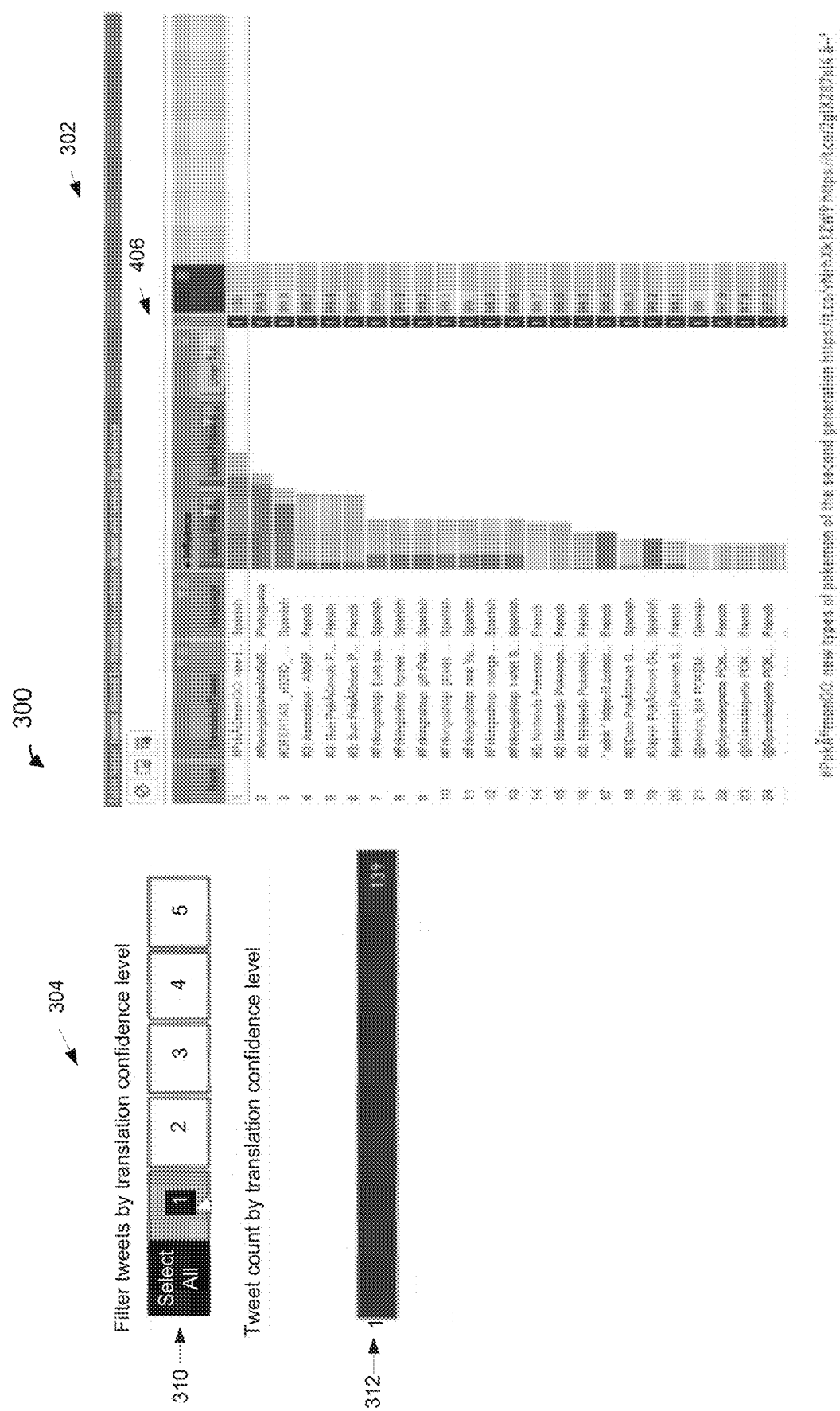
FIGS. 4A-4B are diagrams of a user interface 400 that may be generated by the data analytics system of FIG. 1, and interaction of a user with the user interface 400, according to another embodiment.
Figure 4B:
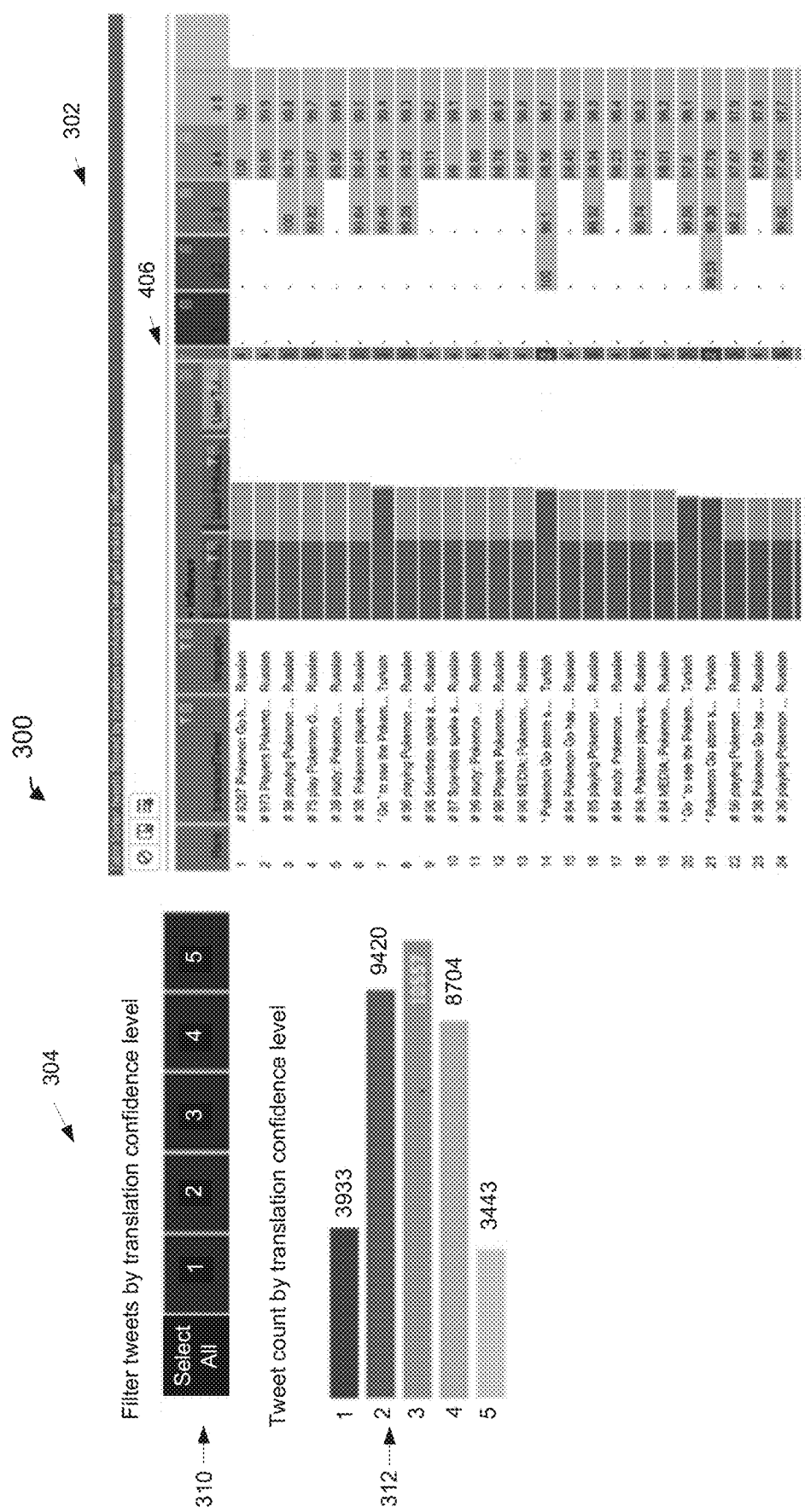

FIGS. 4A-4B are diagrams of a user interface 400 that may be generated to show a table view of the translated tweets in the set of translated tweets that may be depicted in the user interface 300 of FIGS. 3A-3C, and interaction of a user with the user interface 400, according to an embodiment. In an embodiment, the user interface 400 is generated by the data interface application 134 of FIG. 1 to display data provided by the data analytics application 114 of FIG. 1, and to allow a user to interactively explore the data based on quality of data structures inferred or determined from the data. For example, the data interface application 134 generates the user interface 400 to display translated tweets ranked by tweet influence determined by the data structuring engine 116, and to allow a user to interactively explore the tweet influence across different quality levels assigned to the translated tweets by the data quality assignment engine 118. For ease of explanation, the user interface 400 is described with respect to the data analytics system of FIG. 1. However, in other embodiments, the user interface 400 is generated by data analytics systems different from the data analytics systems of FIG. 1.

Referring to FIGS. 4A-4B, the display portion 302 is illustrated as displaying a table 406. The table 406 generally displays translated tweets, in a set of translated tweets or a selected subset thereof, in an order determined by tweet influence, from example from the highest-influence translated tweet to the lowest influence translated tweet. The table 406 may include a plurality of rows 407 respectively associated with translated tweets displayed in the display portion 302. The table 406 also includes a plurality of columns 408, including a rank column 408-1 to show ranks of the translated tweets, a translated tweet column 408-2 to show the actual translated tweets, a language column 408-2 to show the original language of the translated tweets, an influence column 408-3 to illustrate relative strengths of various influence factors of the corresponding translated tweets, a translation confidence column 408-4 to show translation confidence levels of the corresponding translated tweets, and one or more tweet influence percentile columns 408-5 to show tweet relative influence within different subsets of the translated tweets displayed in the display portion 302. The data interface application 134 may visually display an relive influence of a translated tweet by displaying, in the column 410-1, a numerical value (e.g., 100, 99.9, 99.8, etc.) of the influence percentile and/or by showing, in the column 410-1, a bar of a height corresponding to the relative influence (e.g., a relatively taller bar corresponding to a higher influence and a relatively shorter bar corresponding to a lower influence).

The table 406 may generally display an ordered list of translated tweets sorted according to tweet influence of the translated tweets. The tweet influence may be determined for each translated tweet in the set of translated tweets based on one or more factors that may include, but are not limited to, i) a number of times the tweet has been retweeted, ii) a number of twitter followers of an author of the tweet, iii) a number of twitter friends of an author of the tweet. The table 406 may be generated to display one or more subsets of translated tweets, the one or more subsets including translated tweets associated with translation confidence levels indicated by a user in the filter by translation confidence level portion 310. For example, in the scenario illustrated in FIG. 4A, the user indicates, e.g., by clicking on the "1" button in the filter by translation confidence level portion 310, that only the subset of the translated tweets associated with translation confidence level of 1 is to be displayed in the table 406. In response to detecting the indication that only the subset of the translated tweets associated with translation confidence level of 1 is to be displayed, the data interface application 134 may determine influence rankings for the translated tweets among the subset of translated tweets associated with translation confidence level of 1, and may generate the display portion 406 to display the translated tweets based on the tweet influence rankings determined for the translated tweets. The data interface application 134 may additionally determine a relative influence of each translated tweet, relative to all translated tweets in the subset of translated tweets associated with translation confidence level of 1, and may visually display the determined relative influence of each particular translated tweet in the column 410-1, in the row 407 associated with the particular translated tweet.

Referring now to the scenario illustrated in FIG. 4B, the user indicates, for example by clicking on the "Select All" button in the filter by translation confidence level portion 310, that the set of translated tweets, including respective subsets of translated tweets associated with respective different translation confidence levels, is to be displayed in the table 406. In response to detecting the indication that that the set of translated tweets is to be displayed, the data interface application 134 may determine influence rankings for the translated tweets among the translated tweets in the set of translated tweets, and may generate the display portion 406 to display the translated tweets, in the set of translated tweets, based on the tweet influence rankings determined for the translated tweets. As illustrated in FIG. 4B, the highest-influence translated tweet is associated with the relatively low translation confidence level of 4, in the illustrated embodiment. This influential translated tweet would not be shown to the user if the translated tweet were filtered out due to relatively low translation confidence and potentially low translation quality of the translated tweet. However, this influential translated tweet may be of interest and importance to the user due to high influence level of the tweet, and translation quality may actually be sufficient for the user, in at least some scenarios and embodiments.

The data interface application 134 may additionally determine respective relative influences of the translated tweets relative to all translated tweets in the set of the translated tweets and/or relative to all translated tweets in one or more different subsets of translated tweets, and may visually display the determined relative influences in respective columns 410, in the row 407 associated with the translated tweet. For example, for a translated tweet associated with translation confidence level of 5, the data interface application 134 may determine and display relative influence of the translated tweet relative to all translated tweets (i.e., translated associated with translation confidence levels of greater than or equal to 5); for a translated tweet associated with translation confidence level of 4, the data interface application 134 may determine and display relative influences of the translated tweet relative to all translated tweets (i.e., translated associated with translation confidence level of greater than or equal to 5) and relative to a subset of translated tweets that excludes the translated tweets associated with translation confidence level of 5 (i.e., all translated tweets associated with translation confidence levels of greater than or equal to 4); for a translated tweet associated with translation confidence level of 3, the data interface application 134 may determine and display relative influences of the translated tweet relative to all translated tweets (i.e., translated associated with translation confidence level of greater than or equal to 5), relative to a subset of translated tweets that excludes the translated tweets associated with translation confidence level of 5 (i.e., all translated tweets associated with translation confidence levels of greater than or equal to 4), and relative to a subset of translated tweets that excludes the translated tweets associated with translation confidence level of 4 and 5 (i.e., all translated tweets associated with translation confidence levels of greater than or equal to 3); and so on. Such display of relative influences of a translated tweet, relative to different subsets of the translated tweets, allows the user to view whether and how influence of the translated tweet changes as lower-translation confidence tweets are added to the set of translated tweets against which relative influence is measured.

Figure 5A:
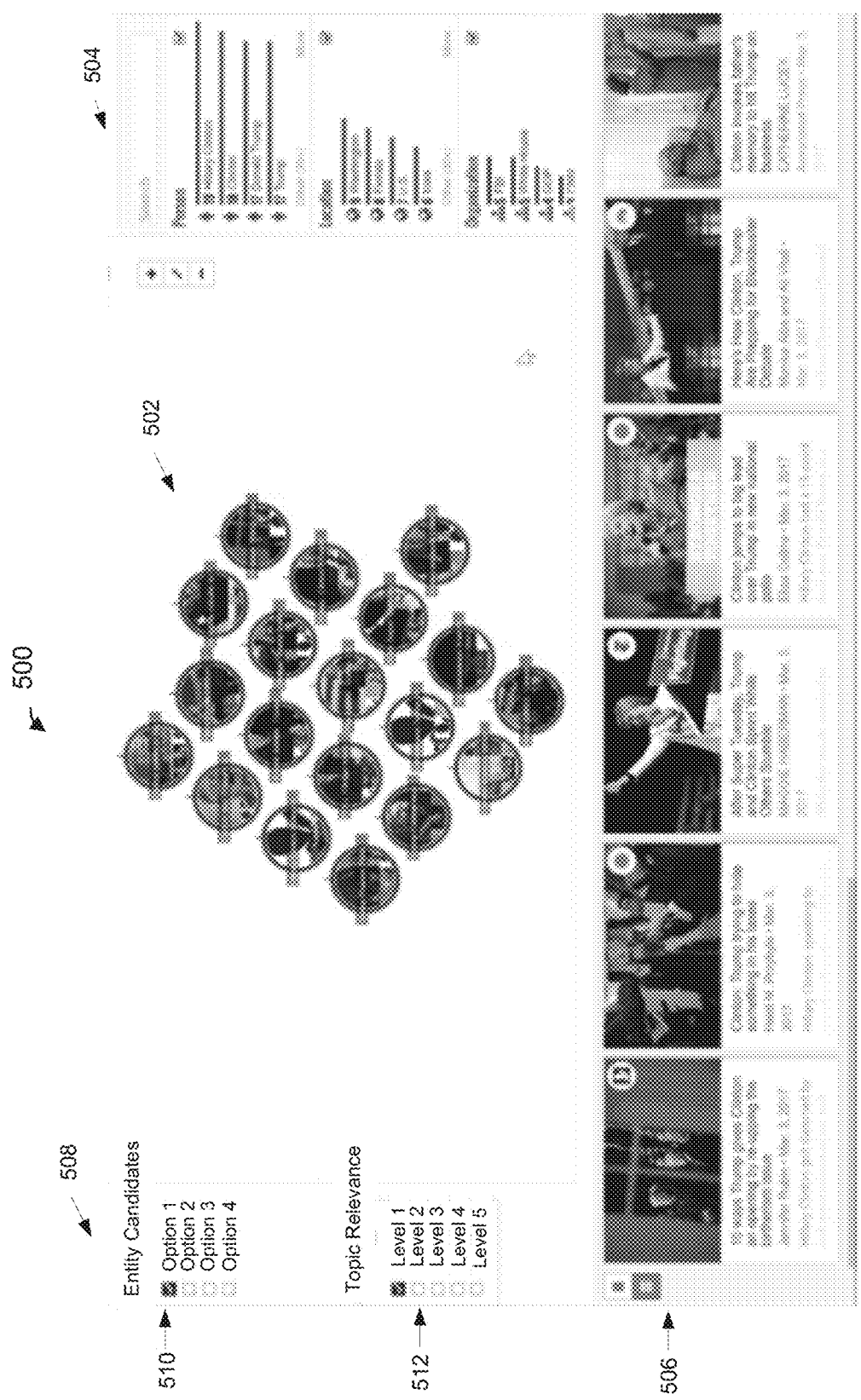
FIGS. 5A-5C are diagrams of a user interface that may be generated by the data analytics system of FIG. 1, and interaction of a user with the user interface, according to another embodiment.
Figure 5B:
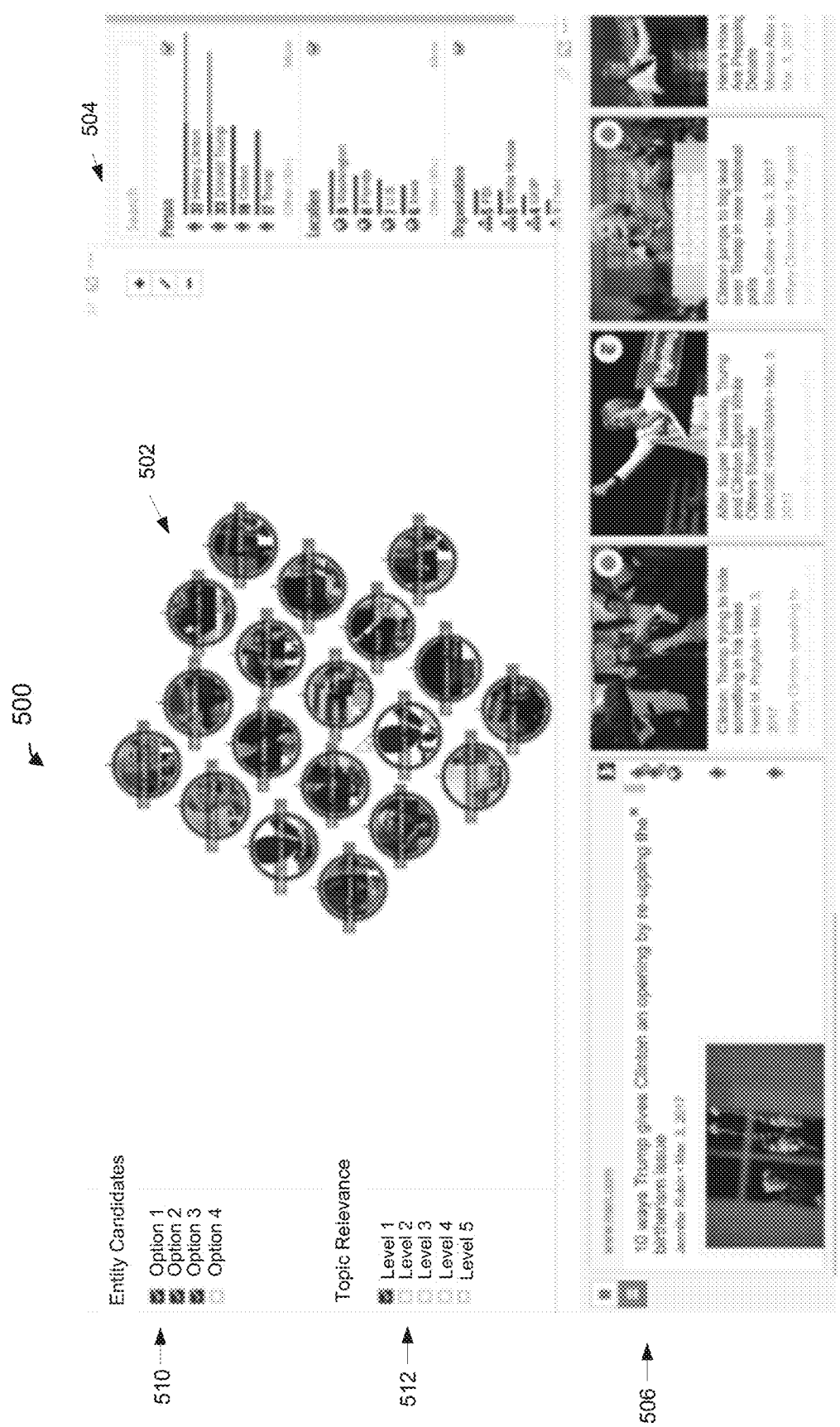
Figure 5C:
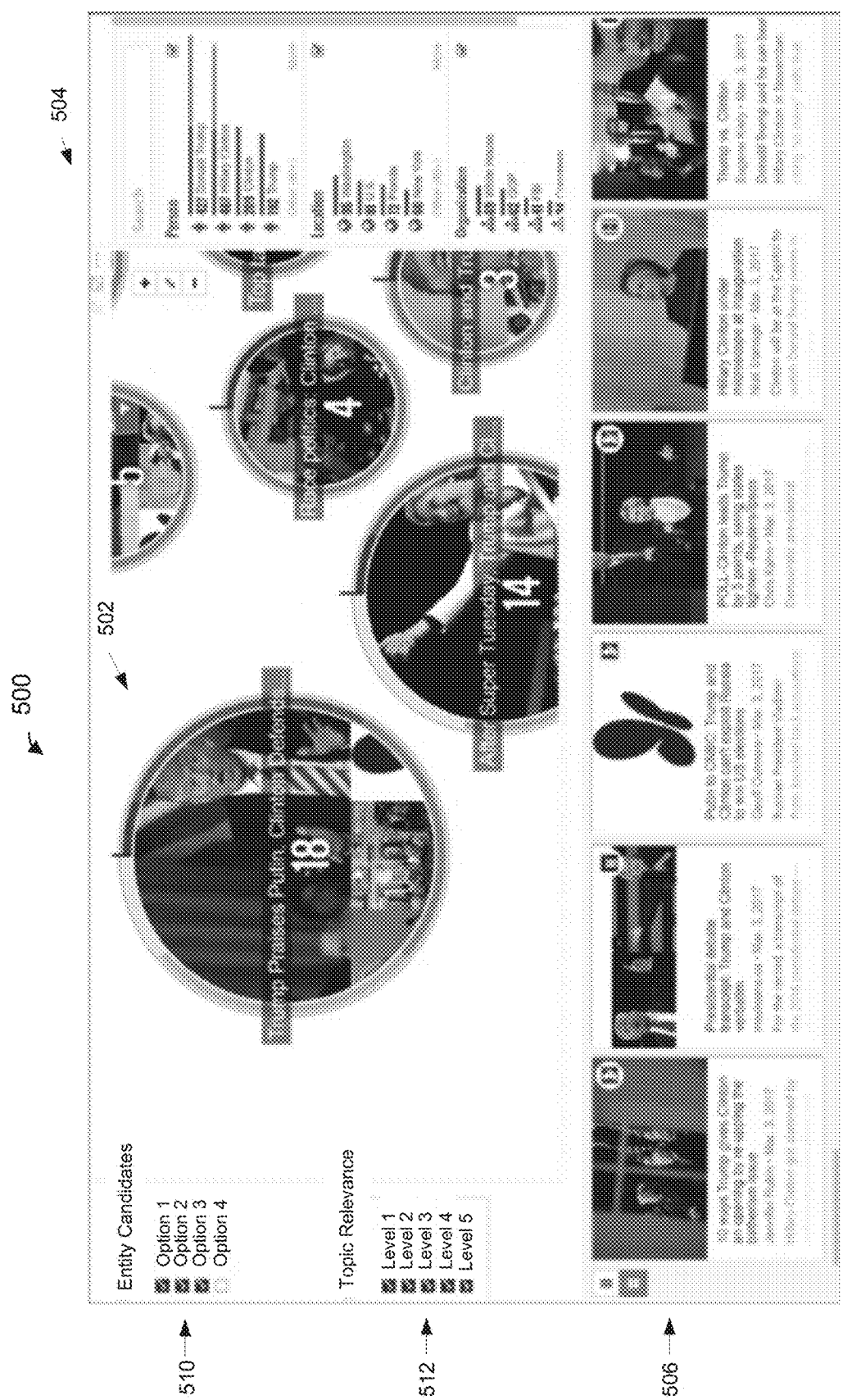

FIGS. 5A-5C are diagrams of a user interface 500 that may be generated to display news articles clustered by topics, and interaction of a user with the user interface 500, according to an embodiment. In an embodiment, the user interface 500 is generated by the data interface application 134 of FIG. 1 to display data provided by the data analytics application 114 of FIG. 1, and to allow a user to interactively explore the data based on quality of data structures inferred or determined from the data. For example, the data interface application 134 generates the user interface 500 to display clusters of news articles according to named entities and/or topics inferred by the data structuring engine 116, and to allow a user to interactively explore the groupings across named entity rankings and/or topic relevance rankings assigned to the news articles by the data quality assignment engine 118. For ease of explanation, the user interface 500 is described with respect to the data analytics system of FIG. 1. However, in other embodiments, the user interface 500 is generated by data analytics systems different from the data analytics systems of FIG. 1.

Referring to FIGS. 5A-5C, the user interface 500 includes an inferred data display portion 502, a metadata display portion 504, actual data display portion 506, and an interactive control portion 508. The inferred data display portion 502 may display clusters of news articles grouped based on inferences made by the data structuring engine 116, and based on data qualities assigned to the inferences by the data quality assignment engine 118. For example, in an embodiment, the data structuring engine 116 may analyze news articles to infer entities, such as people, places, organizations, etc., named in the news articles. For each entity identified by the data structuring engine 116, the structuring inference engine 116 may determine multiple candidates, and the data quality assignment engine 118 may assign a quality level (e.g., a ranking, a likelihood level, a confidence level, etc.) to each of the candidates. As another example, the data structuring engine 116 may analyze news articles to cluster news articles based on identified related topics in the news articles, and the data quality assignment engine 118 may assign a quality level (e.g., a topic relevance) to each news article in a cluster of news articles. The data interface application 134 may represent each cluster in the data display portion 502 with a shape, such as a circle. The data interface application 134 may indicate the number of news articles included in a cluster, for example by displaying the number of news articles within the shape corresponding to the cluster or in the vicinity of the shape corresponding to the cluster. In some embodiments, the data interface application 134 may display distribution of topic relevance in a cluster, for example by displaying bars or segments within the shape corresponding to the cluster or in the vicinity of the shape corresponding to the cluster, with respective differently colored or shaded bars or segments signifying subsets of news articles associated with deferent relevance levels.

The metadata display portion 504 may display most frequent entities, including person entities, location entities and organization entities, identified in the news articles included in the clusters displayed in the data display portion 502, or in a selected cluster in the data display portion 502. The actual data display portion 506 may display actual news articles, for example actual news articles included in a selected cluster.

The interactive display control portion 508 includes an "entity candidates" portion 510 and a "topic relevance" portion 512, in the illustrated embodiment. The entity candidate portion 510 allows a user to indicate ranking and/or confidence levels, assigned to named entity candidates by the data quality assignment engine 118, to be used for determining most frequently mentioned entities in the analyzed news articles, or in analyzed news articles grouped into a particular cluster. The entity candidates portion 510 is illustrated in FIGS. 5A-5C as including four options. In an embodiment, a first option (e.g., "Option 1") may correspond to a highest ranked candidate, a second option (e.g., "Option 2") may correspond to the second highest ranked candidate, a third option (e.g., "Option 3") may correspond to the third highest ranked candidate and a fourth most likely named entity option (e.g., "Option 4") may correspond to the fourth highest ranked candidate. As another example, in another embodiment, a first option (e.g., "Option 1") may correspond to a most likely named entity candidate (e.g., 75%-100% confidence level), a second option (e.g., "Option 2") may correspond to a second most likely named entity candidate (e.g., 50%-<74% confidence level), a third option (e.g., "Option 3") may correspond to a third most likely named entity candidate (e.g., 25%-49% confidence level) and a fourth most likely named entity option (e.g., "Option 4") may correspond to a fourth most likely named entity option (e.g., 0%-24%) confidence level, for example. In other embodiments, other suitable numbers of named entity candidates and/or other data quality indicators are utilized.

The topic relevance portion 512 allows a user to indicate a degree of relevance to be used for inclusion of an article in a cluster of articles related to a topic. The topic relevance portion 512 is illustrated in FIGS. 5A-5C as including five relevance level options, with level 1 corresponding to the highest relevance level and level 5 corresponding to the lowest relevance level, for example. In other embodiments, other suitable numbers of relevance levels are utilized.

Referring now to specifically to FIG. 5A, a user has indicated in the entity candidates portion 510 that option 1 (e.g., highest level of confidence) is to be used for determining most frequently mentioned entities in the news articles included in the clusters displayed in the data display portion 502, and has indicated in the topic relevance portion 512 that only the most relevant news articles are to be included in the clusters displayed in the data portion 502. In response to detecting the indication in the topic relevance portion 512 that only the most relevant news articles are to be included in the clusters displayed in the data display portion 502, the data interface application 134 may cluster news articles associated with only the most relevant news articles and may generate the data display portion 502 to display the clusters that include only the most relevant news articles. In response to detecting the indication that option 1 (e.g., highest rank, highest level of confidence, etc.) is selected in the entity candidates portion 510, the data interface application 134 may identify the most frequently mentioned named entities in the news articles using only the first (most likely) named entity candidates associated with option 1 level assigned to the candidates by the data quality assignment engine 118. The data interface application 134 may display the identified most frequently mentioned entities in the metadata display portion 504. For example, the data interface application 134 identifies "Hillary Clinton, Clinton, Donald Trump, and Trump" as the top four most frequently mentioned named entities, in the illustrated embodiment. Thus, using only the most likely named entity candidates lead the data interface application 134 to identify Hillary Clinton and Clinton as separate named entities, in the illustrated embodiment. Similarly, using only the most likely named entity candidates lead the data interface application 134 to identify Donald Trump and Trump as separate named entities, in the illustrated embodiment. The data interface application 134 may additionally display numbers of times each named entity is mentioned.

Referring now to FIG. 5B, the user has changed the selections in the entity candidates portion 510 to indicate that option 1, option 2, and option 3 are to be used for determining the most frequently mentioned entities in the news articles included in the clusters in the data display portion 502. In response to detecting the indication in the entity candidates portion 510 that option 1, option 2, and option 3 are to be used for determining the most frequently mentioned entities in the news articles included in the clusters in the data display portion 50, the data interface application 134 may identify the most frequently mentioned named entities in the news articles based on named entity candidates associated with option 1 level, option 2 level, and option 3 level assigned to the named entity candidates by the data quality assignment engine 118. The data interface application 134 may modify the metadata display portion 504 to display the most frequently named entities identified based on the named entity candidates associated with option 1 level, option 2 level and option 3 level. As shown in FIG. 5B, the data interface application 134, based on the named entity candidates associated with option 1 level, option 2 level and option 3 level, identified "Hilary Clinton and Donald Trump" as the top two most frequently named entities in the analyzed news articles, in the illustrated embodiment.

Referring now to FIG. 5C, the user has changed the selections in the topic relevance portion 512 to indicate that news articles associated with all topic relevance levels are to be included in the clusters in the data display portion 502. In response to detecting the indication in the topic relevance portion 512 that news articles associated with all topic relevance levels are to be included, the data interface application 134 may cluster news articles associated with all topic relevance levels and may modify the data display portion 502 to display the clustered news articles associated with all topic relevance levels. The data interface application 134 represents each cluster in the data display portion 502 with a circle, in the illustrated embodiment. Further, the data interface application 134 indicates the number of news articles included in a cluster by displaying the number of news articles within the circle corresponding to the cluster, in the illustrated embodiment. The data interface application 134 also displays distribution of topic relevance in a cluster by displaying segments surrounding the circle corresponding to the cluster, with respective differently colored or shaded bars or segments signifying subsets of news articles associated with deferent relevance levels, in the illustrated embodiment. The data interface application 134 may additionally modify the metadata display portion 504 to display the most frequently named entities identified based on the named entity candidates associated with option 1 level, option 2 level and option 3 level in the clustered news articles associated with all topic relevance levels included in the clusters in the data display portion 502.

Figure 6:
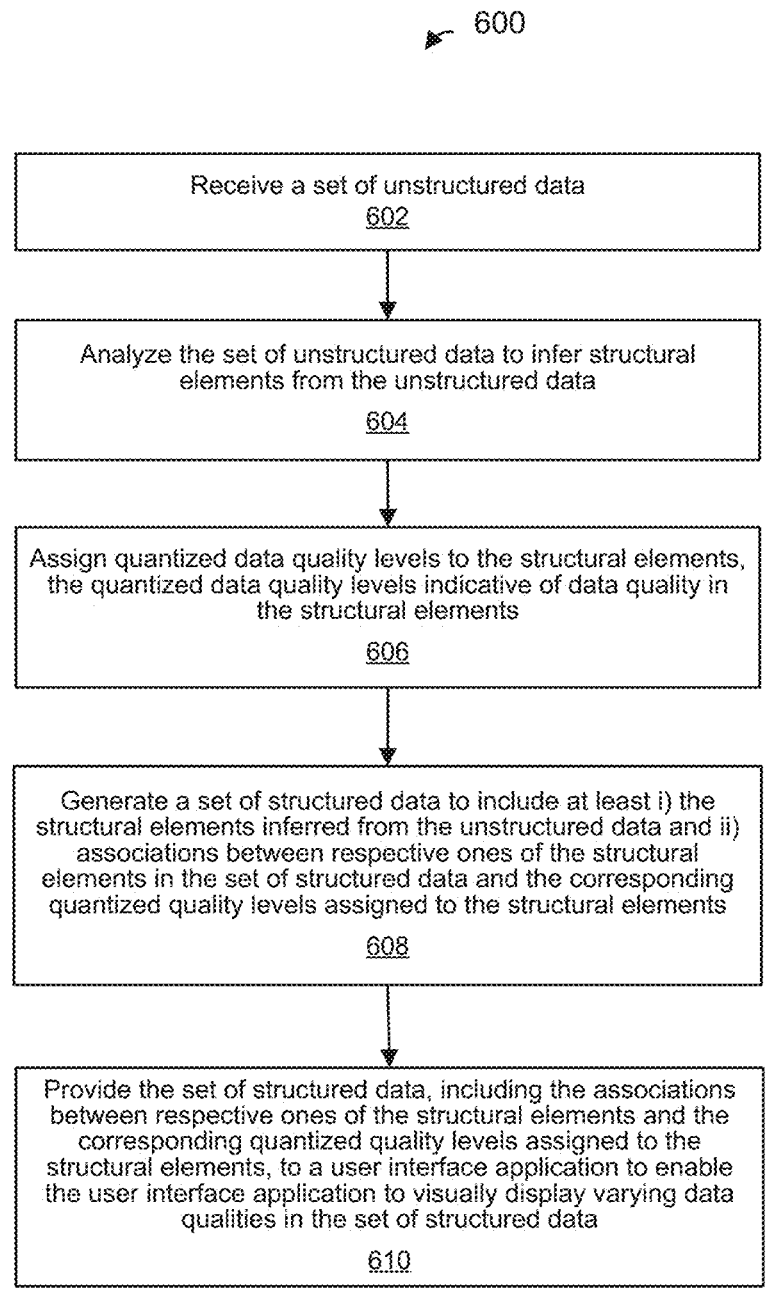
FIG. 6 is a flow diagram illustrating an example method for analyzing unstructured data that may be implemented by the data analytics system of FIG. 1, according to an embodiment.

FIG. 6 is a flow diagram of a method 600 for analyzing unstructured data, according to an embodiment. In an embodiment, the method 600 is implemented in conjunction with the system 100 of FIG. 1. For example, the method 600 is implemented at least partially by the server device 104 (e.g., the data analytics application 114 of the server device 104), in an embodiment. As another example, the method 600 is implemented at least partially by the user device 102 (e.g., the data interface application 134 of the user device 102). In other embodiments, the method 600 is implemented by suitable devices different from the user device 102 and/or the server device 104 and/or is implemented in conjunction with systems different from the system 100.

At block 602, a set of unstructured data is received. For example, a set of social media postings may be received. As another example, a set of documents, such as a set of news articles may be received. In other embodiments, other suitable sets of unstructured data are received.

At block 604, the set of unstructured data is analyzed to infer structural elements from the unstructured data. As just an example, in an embodiment in which the set of unstructured data comprises a set of social media postings, the set of unstructured data may be analyzed to infer connections between hashtags used in the social media postings and original languages of the social media postings. As another example, in an embodiment, the set of unstructured data may be analyzed to infer a distribution of translated foreign language social media postings (e.g., tweets) over time. As yet another example, in an embodiment in which the set of unstructured data comprises a set of news articles, the set of unstructured data is analyzed to infer named entities in the news articles and/or to infer similar topics within the news articles.

At block 606, quantized data quality levels to are assigned to the structural elements inferred at block 604. The quantized data quality levels may be indicative of data quality in the structural elements. The quantized data quality levels may be determined based on confidence levels of inferences obtained at block 604. For example, the quantized data quality levels may be determined based on co-occurrence levels of hashtags in social media postings in different language, translation confidence levels of translated social media postings, confidence level of named entities identified in news articles, relevance of news articles to a topic, etc.

At block 608 a set of structured data to include at least i) the structural elements inferred from the unstructured data at block 604 and ii) associations between respective ones of the structural elements in the set of structured data and the corresponding quantized quality levels assigned to the structural elements at block 606.

At block 610 the set of structured data generated at block 608, including the associations between respective ones of the structural elements and the corresponding quantized quality levels assigned to the structural elements, is provided to a user interface application to enable the user interface application to visually display varying data qualities in the set of structured data.

Figure 7:
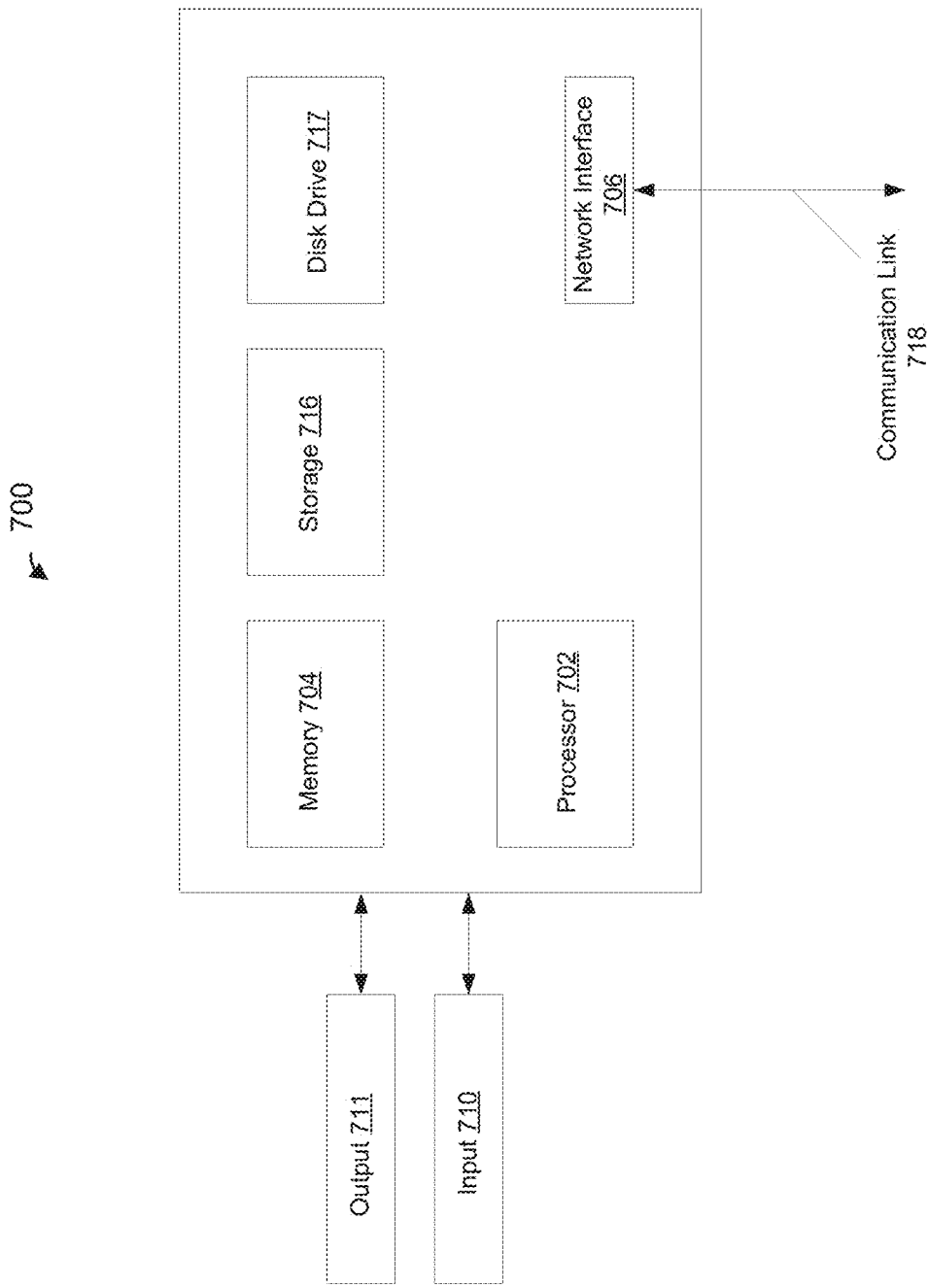
FIG. 7 is a block diagram of a computer system suitable for implementing one or more components of the data analytics system of FIG. 1, according to an embodiment.

FIG. 7 is a block diagram of a computing system 700 suitable for implementing one or more embodiments of the present disclosure. In its most basic configuration, the computing system 700 may include at least one processor 702 and at least one memory 704. The computing device 700 may also include a bus (not shown) or other communication mechanism for communicating information data, signals, and information between various components of computer system 700. Components may include an input component 710 that processes a user action, such as selecting keys from a keypad/keyboard, selecting one or more buttons or links, etc., and sends a corresponding signal to the at least one processor 702. Components may also include an output component, such as a display, 711 that may display, for example, results of operations performed by the at least one processor 702. A transceiver or network interface 706 may transmit and receive signals between computer system 700 and other devices, such as user devices that may utilize results of processes implemented by the computer system 700. In one embodiment, the transmission is wireless, although other transmission mediums and methods may also be suitable.

The at least one processor 702, which can be a microcontroller, digital signal processor (DSP), or other processing component, processes these various signals, such as for display on computer system 700 or transmission to other devices via a communication link 718. The at least one processor 702 may also control transmission of information, such as cookies or IP addresses, to other devices. The at least one processor 702 may execute computer readable instructions stored in the memory 704. The computer readable instructions, when executed by the at least one processor 702, may cause the at least one processor 702 to implement processes associated with determination of a user context, generation of customized translated content based on the user context, output of the customized translated content, etc. as described above.

Components of computer system 700 may also include at least one static storage component 716 (e.g., ROM) and/or at least one disk drive 717. Computer system 700 may perform specific operations by processor 712 and other components by executing one or more sequences of instructions contained in system memory component 714. Logic may be encoded in a computer readable medium, which may refer to any medium that participates in providing instructions to the at least one processor 702 for execution. Such a medium may take many forms, including but not limited to, non-transitory media, non-volatile media, volatile media, and transmission media. In various implementations, non-volatile media includes optical or magnetic disks, volatile media includes dynamic memory, such as system memory component 716, and transmission media includes coaxial cables, copper wire, and fiber optics. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

While various operations of a data analytics system have been described herein in terms of "modules" or "components," it is noted that that terms are not limited to single units or functions. Moreover, functionality attributed to some of the modules or components described herein may be combined and attributed to fewer modules or components. Further still, while the present invention has been described with reference to specific examples, those examples are intended to be illustrative only, and are not intended to limit the invention. It will be apparent to those of ordinary skill in the art that changes, additions or deletions may be made to the disclosed embodiments without departing from the spirit and scope of the invention. For example, one or more portions of methods described above may be performed in a different order (or concurrently) and still achieve desirable results.

What is claimed is:

1. A method for analyzing unstructured data, the method comprising:
   receiving, at one or more hardware processors, a set of unstructured data;
   analyzing, with the one or more hardware processors, the set of unstructured data to infer structural elements from the unstructured data, including determining inference qualities of the structural elements, the analyzing comprising obtaining machine translations of data items in the set of unstructured data from a first language to a second language;
   assigning, with the one or more hardware processors, quantized inference quality levels to the structural elements, the quantized inference quality levels being selected, based on the inference qualities of the structural elements, from a set comprising a plurality of predetermined inference quality levels, the assigning comprising assigning the quantized inference quality levels based at least in part on respective translation confidence scores corresponding to respective data items, the translation confidence scores being based on one or both of reputation of a machine translation engine of the translation and trust of the machine translation engine of the translation;
   generating, with the one or more hardware processors, a set of structured data to include at least i) the structural elements inferred from the unstructured data and ii) associations between respective ones of the structural elements in the set of structured data and the corresponding quantized quality levels assigned to the structural elements; and
   providing, with the one or more hardware processors, the set of structured data, including the associations between respective ones of the structural elements and the corresponding quantized quality levels assigned to the structural elements, to a user interface application to enable the user interface application to visually display varying inference qualities in the set of structured data.

2. The method of claim 1, wherein
   analyzing the set unstructured data comprises analyzing the set of unstructured data using a machine learning engine, and
   assigning quantized inference quality levels to the structural elements comprises assigning the quantized inference quality levels based at least in part on certainty qualifiers, for the structural elements, provided by the machine learning engine.

3. The method of claim 1, wherein the translation confidence scores being indicative of likelihood of accuracy of machine translation obtained for the corresponding data items and being based on both of reputation of the machine translation engine of the translation and trust of the machine translation engine of the translation.

4. The method of claim 1, wherein
   analyzing the set of unstructured data includes grouping data items of the unstructured data according to a topic, and
   assigning quantized inference quality levels to the structural elements comprises assigning the quantized inference quality levels based at least in part on respective relevance scores corresponding to respective data items, the relevance scores being indicative of degree of relevance of the corresponding data items to the topic.

5. The method of claim 1, further comprising
   detecting, with the user interface application, a user selection indicating one or more quality levels of the quantized quality levels,
   selecting, with the user interface application, one or more subsets of the set of structured data to be displayed to the user, the one or more subsets including structural elements associated with the one or more selected quality levels, and
   causing, with the user interface application, the selected one or more subsets of the set of structured data to be displayed to the user.

6. The method of claim 5, wherein causing the selected one or more subsets of the set of structural data to be displayed to the user comprises causing multiple subsets of the set of the structured data to be simultaneously displayed to the user, including causing visual representations of respective inference quality levels of respective ones of the multiple subsets to be displayed to the user.

7. The method of claim 5, further comprising causing, with the user interface application, data items of the unstructured data to be displayed to the user, including limiting display of the data items of the unstructured data to data items that correspond with data items included in the selected one or more subsets of the structured data.

8. The method of claim 1, wherein providing the set of structured data to the user interface application comprises storing the set of structured data in a database accessible by the user interface application.

9. A system, comprising:
   a non-transitory memory for storing instructions;
   one or more hardware processors that are coupled to the non-transitory memory and that are configured to execute the instructions to cause the system to perform operations comprising:

receiving a set of unstructured data, analyzing the set of unstructured data to infer structural elements from the unstructured data, including determining inference qualities of the structural elements, the analyzing comprising obtaining machine translations of data items in the set of unstructured data from a first language to a second language, assigning quantized inference quality levels to the structural elements, the quantized inference quality levels being selected, based on the inference qualities of the structural elements, from a set comprising a plurality of predetermined inference quality levels, the assigning comprising assigning the quantized inference quality levels based at least in part on respective translation confidence scores corresponding to respective data items, the translation confidence scores being based on one or both of reputation of a machine translation engine of the translation and trust of the machine translation engine of the translation, generating a set of structured data to include at least i) the structural elements inferred from the unstructured data and ii) associations between respective ones of the structural elements in the set of structured data and the corresponding quantized quality levels assigned to the structural elements, and providing the set of structured data, including the associations between respective ones of the structural elements and the corresponding quantized quality levels assigned to the structural elements, to a user interface application to enable the user interface application to visually display varying inference qualities in the set of structured data.

10. The system of claim 9, wherein analyzing the set unstructured data comprises analyzing the set of unstructured data using a machine learning engine, and assigning quantized inference quality levels to the structural elements comprises assigning the quantized inference quality levels based at least in part on certainty qualifiers, for the structural elements, provided by the machine learning engine.

11. The system of claim 9, wherein analyzing the set of unstructured data includes both of i) obtaining machine translations of data items in the set of unstructured data from the first language to the second language, and ii) grouping data items of the unstructured data according to a topic, and the translation confidence scores being indicative of likelihood of accuracy of machine translation obtained for the corresponding data items, respective relevance scores corresponding to respective data items, the relevance scores being indicative of degree of relevance of the corresponding data items to the topic, and the translation confidence scores being based on both of reputation of the machine translation engine of the translation and trust of the machine translation engine of the translation.

12. The system of claim 9, wherein the operations further comprise detecting a user selection indicating one or more quality levels of the quantized quality levels, selecting one or more subsets of the set of structured data to be displayed to the user, the one or more subsets including structural elements associated with the one or more selected quality levels, and causing the selected one or more subsets of the set of structured data to be displayed to the user.

13. The system of claim 12, wherein causing the selected one or more subsets of the set of structural data to be displayed to the user comprises causing multiple subsets of the set of the structured data to be simultaneously displayed to the user, including causing visual representations of respective inference quality levels of respective ones of the multiple subsets to be displayed to the user.

14. The system of claim 12, wherein the operations further comprise causing data items of the unstructured data to be displayed to the user, including limiting display of the data items of the unstructured data to data items that correspond with data items included in the selected one or more subsets of the structured data.

15. A non-transitory computer readable medium, or media, storing machine readable instructions that, when executed by one or more processors, cause the one or more processors to:

receive a set of unstructured data;

analyze the set of unstructured data to infer structural elements from the unstructured data, the analyzing including determining inference qualities of the structural elements, the analyzing comprising obtaining machine translations of data items in the set of unstructured data from a first language to a second language;

assign the quantized inference quality levels being selected, based on the inference qualities of the structural elements, from a set comprising a plurality of predetermined inference quality levels, the assigning comprising assigning the quantized inference quality levels based at least in part on respective translation confidence scores corresponding to respective data items, the translation confidence scores being based on one or both of reputation of a machine translation engine of the translation and trust of the machine translation engine of the translation;

generate a set of structured data to include at least i) the structural elements inferred from the unstructured data and ii) associations between respective ones of the structural elements in the set of structured data and the corresponding quantized quality levels assigned to the structural elements; and provide the set of structured data, including the associations between respective ones of the structural elements and the corresponding quantized quality levels assigned to the structural elements, to a user interface application to enable the user interface application to visually display varying inference qualities in the set of structured data.

16. The non-transitory computer-readable medium or media of claim 15, wherein the machine readable instructions, when executed by the one or more processors, cause the one or more processors to analyzing the set unstructured data using a machine learning engine, and assign quantized inference quality levels to the structural elements based at least in part on certainty qualifiers, for the structural elements, provided by the machine learning engine.

17. The non-transitory computer-readable medium or media of claim 15, wherein the machine readable instructions, when executed by the one or more processors, cause the one or more processors to analyze the set of unstructured data at least by both of i) obtaining machine translations of data items in the set of unstructured data from the first language to the second language, and ii) grouping data items of the unstructured data according to a topic, and the translation confidence scores being indicative of likelihood of accuracy of machine translation obtained for the corresponding data items, respective relevance scores corresponding to respective data items, the relevance scores being indicative of degree of relevance of the corresponding data items to the topic, and the translation confidence scores being based on both of reputation of the machine translation engine of the translation and trust of the machine translation engine of the translation.

18. The non-transitory computer-readable medium or media of claim 15, further storing machine readable instructions that, when executed by the one or more processors, cause the one or more processors to detect a user selection indicating one or more quality levels of the quantized quality levels, select one or more subsets of the set of structured data to be displayed to the user, the one or more subsets including structural elements associated with the one or more selected quality levels, and cause the selected one or more subsets of the set of structured data to be displayed to the user.

19. The non-transitory computer-readable medium or media of claim 18, wherein the machine readable instructions, when executed by the one or more processors, cause the one or more processors to cause multiple subsets of the set of the structured data to be simultaneously displayed to the user, including causing visual representations of respective inference quality levels of respective ones of the multiple subsets to be displayed to the user.

* * * * *